US008909465B2

(12) United States Patent
Nesbitt

(10) Patent No.: US 8,909,465 B2
(45) Date of Patent: Dec. 9, 2014

(54) USER-CONTROLLED ALTERNATIVE ROUTING

(75) Inventor: David W. Nesbitt, Adamstown, MD (US)

(73) Assignee: MapQuest, Inc., Denver, CO (US)

( * ) Notice: Subject to any disclaimer, the term of this patent is extended or adjusted under 35 U.S.C. 154(b) by 2143 days.

(21) Appl. No.: 11/320,495

(22) Filed: Dec. 29, 2005

(65) Prior Publication Data

US 2007/0156326 A1    Jul. 5, 2007

(51) Int. Cl.
*G01C 21/00* (2006.01)
*G01C 21/34* (2006.01)

(52) U.S. Cl.
CPC ................................. *G01C 21/3461* (2013.01)
USPC ............ 701/200; 701/400; 701/410; 701/426

(58) Field of Classification Search
USPC ......................................... 701/201, 202, 209
See application file for complete search history.

(56) References Cited

U.S. PATENT DOCUMENTS

| | | | | |
|---|---|---|---|---|
| 5,878,368 A * | 3/1999 | DeGraaf | .......................... | 701/411 |
| 6,321,158 B1 * | 11/2001 | DeLorme et al. | .............. | 701/426 |
| 6,587,780 B2 * | 7/2003 | Trovato | .......................... | 701/117 |
| 6,622,087 B2 * | 9/2003 | Anderson | ...................... | 701/423 |
| 6,678,611 B2 * | 1/2004 | Khavakh et al. | .............. | 701/418 |
| 6,732,048 B2 * | 5/2004 | Blewitt | ........................... | 701/533 |
| 6,992,598 B2 * | 1/2006 | Poltorak | ................... | 340/995.19 |
| 7,089,110 B2 * | 8/2006 | Pechatnikov et al. | .......... | 701/411 |
| 8,473,198 B2 * | 6/2013 | Krumm et al. | ................. | 701/425 |
| 8,688,371 B2 * | 4/2014 | Cheung et al. | ................. | 701/410 |
| 8,793,065 B2 * | 7/2014 | Seltzer et al. | .................. | 701/400 |
| 2005/0027442 A1 * | 2/2005 | Kelley et al. | ................... | 701/202 |
| 2006/0129313 A1 * | 6/2006 | Becker et al. | ................. | 701/202 |

OTHER PUBLICATIONS

Able2Know.com Website, available at http://www.Able2know.com/forums/about53712/html, reprinted on Oct. 6, 2005, 11 pages.
DeLorme Street Atlas USA 2006 Website, available at http://www.earthamaps.com/streetatlasusa/default.asp, reprinted on Sep. 30, 2005, 4 pages.
Microsoft Streets & Trips 2005 Website, available at http://www.microsoft.com/streets/ProductDetails.aspx?pid=002, reprinted on Sep. 30, 2005, 2 pages.
Microsoft Compare Streets & Trips Website, available at http://www.microsoft.com/streets/choose.aspx, reprinted on Sep. 30, 2005, 1 page.
Alternatives to Maps: Mapping and routing software for the PC, There Are Places Website, available at http://www.thereareplaces.com/infgdes/mapsguides/mppc.htm, reprinted on Sep. 30, 2005, 4 pages.
RAC Route Planner Website, available at http://rp.rac.co.uk/routeplanner, reprinted on Sep. 30, 2005, 2 pages.
James D. Foley et al., "Bizier Curves," Computer Graphics Principles and Practice, Second Edition, Addison-Wesley Publishing Company, Inc., Section 11.2.2, pp. 488-516.
International Search Report issued in International Application No. PCT/US06/46610 mailed Feb. 26, 2007, 10 pages.

* cited by examiner

*Primary Examiner* — Jonathan M Dager
(74) *Attorney, Agent, or Firm* — Finnegan, Henderson, Farabow, Garrett & Dunner, LLP

(57) ABSTRACT

A user may indicate a preference of a route when alternative routes are available between an origin and a destination. The mapping system may enable a user to identify a region, a point or a set of points to help control, guide or otherwise influence the determination of a route favored by the user. While the identified region, point or set of points may be included in the route, the identified region, point or set of points need not necessarily be included in the route.

30 Claims, 15 Drawing Sheets

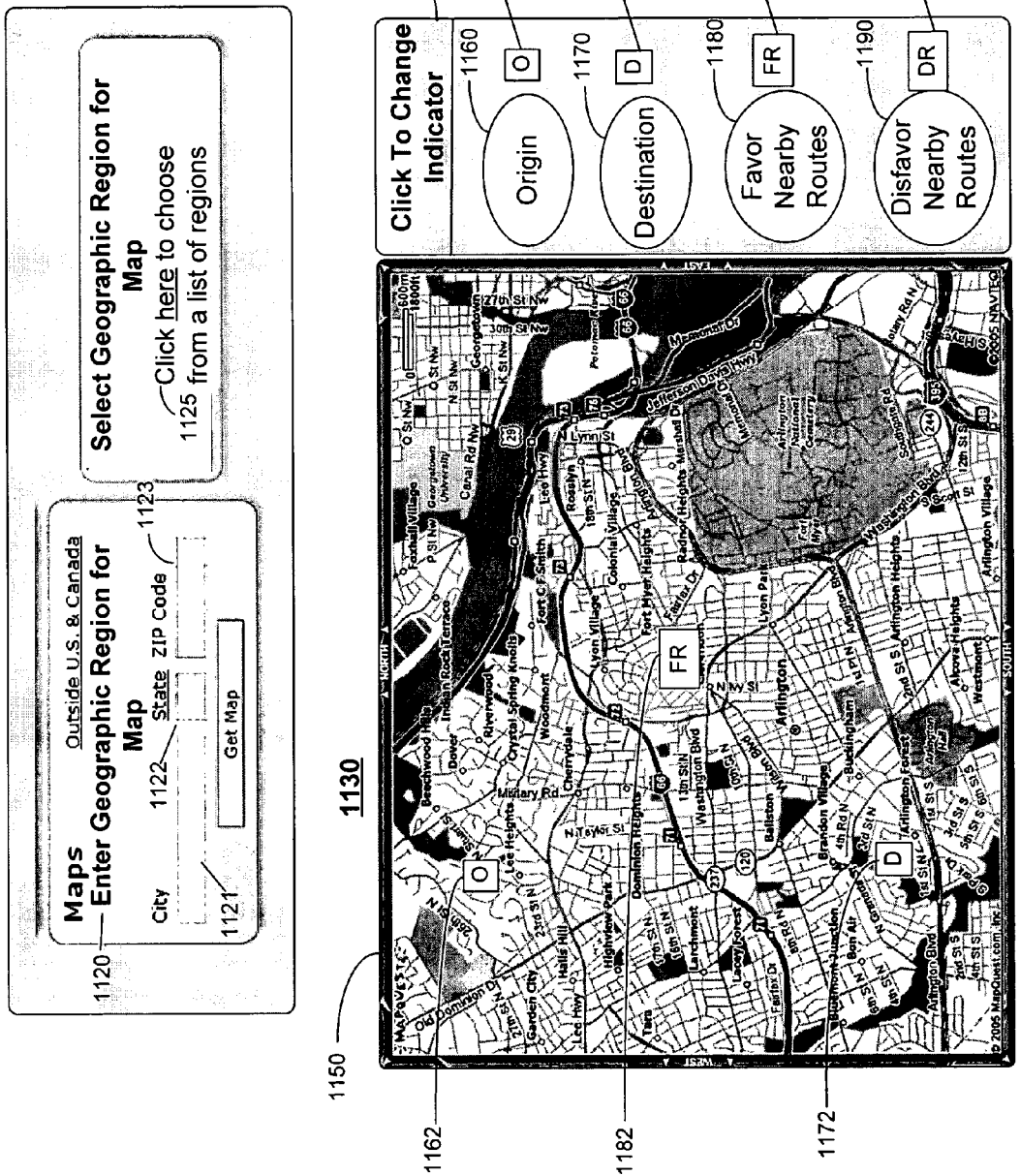

1300A

1300B

USER-CONTROLLED ALTERNATIVE ROUTING

TECHNICAL FIELD

This document relates to determining a route between an origin location and a destination location.

BACKGROUND

A travel route between an origin location and a destination location may be requested by a user and determined by a computer system, which may be referred to as a mapping system. The mapping system may make this determination by searching for an optimal path through a directed graph (e.g., a collection of nodes and edges (or links)) that represents a network of roads and intersections. When several routes between the origin location and the destination location exist, the route determined by the mapping system may not be the route preferred by the user.

SUMMARY

In one general aspect, a route is determined using a computer-implemented mapping system. A designation of a geographic region is received as input to influence route selection between an origin and a destination. The designation is received from a user of a computer-implemented mapping system and is in a location other than a location of the origin or the destination. The designation of the geographic region is used to determine a route from the origin to the destination. The designation indicates the user's preference for one of multiple alternative routes between the origin and the destination. The route is presented to the user.

Implementations may include one or more of the following features. For example, the designation may reflect a favored geographic region and indicate the user's preference for a route that is closer to the geographic region than other ones of the multiple alternative routes. Alternatively, the designation may reflect a disfavored geographic region and indicate the user's preference for a route that is farther from the geographic region than other ones of the multiple alternative routes.

At least part of a routing graph representing a network of roads including two or more nodes and one or more links may be accessed. A link may be associated with at least two nodes and a cost. The designation may reflect a disfavored geographic region. If so, using the designation of the geographic region to determine a route may include increasing a cost associated with a link that is proximate to the disfavored geographic region reflected by the designation. Increasing the cost of the link may include increasing the cost of the link if the link is within a particular radius from the designation of the geographic region. Increasing the cost may include increasing the cost by an amount depending on the distance between a node of the link and the designation of the geographic region.

The designation may reflect a favored geographic region. If so, using the designation of the geographic region to determine a route may include decreasing a cost associated with a link that is proximate to the favored geographic region reflected by the designation. Decreasing the cost of the link may include decreasing the cost of the link if the link is within a particular radius from the designation of the geographic region. Decreasing the cost may include decreasing the cost by an amount depending on the distance between a node of the link and the designation of the geographic region.

Using the designation may include determining a route that does not traverse the geographic region corresponding to the designation.

The designation may relate to a geographic location identified by a user. A user may select a pre-determined designation of a geographic region to influence route selection, such that the designation of the geographic region is the pre-determined designation.

Receiving a designation of a geographic region may include receiving an indication of a geographic region, such as receiving an indication of multiple states, a state, a county, a city, a range of zip codes, and a zip code. Receiving an indication of a geographic region may include receiving a travel direction, such as east, west, north, or south.

A user may be presented with a map related to a geographic region selected by the user and the designation of the geographic region may be received based on the map. Receiving the designation of the geographic region may include receiving an identification of a portion of the map. More than one designation of a geographic region may be depicted on the presented map and one or more designations of a geographic region may be received based on a selection made by the user.

A navigation system may be used to determine the route between the origin and the destination. The computer-implemented mapping system may include an online system.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

FIGS. 10 and 11 illustrate exemplary user interfaces to allow a user to enter an origin, a destination, and route preference information.

DETAILED DESCRIPTION

A user of a mapping system may favor one of multiple possible routes between an origin and a destination. However, the favored route may not necessarily be the route generated by the mapping system when a user requests a route between the origin and destination. In a particular example, though a user may desire to take an easterly route between an origin and a destination, the generated route may reflect a westerly route between the origin and the destination.

Techniques are described to allow a user to indicate a preference of a route when alternative routes are available between an origin and a destination. The mapping system may enable a user to identify a region, a point or a set of points that influence the route between the origin and destination to help control, guide or otherwise influence, the determination of a route favored by the user. While the identified region, point or set of points may be included in the route, the identified region, point or set of points need not necessarily be included in the route.

In one example, one route between Dulles, Va. and Lancaster, Pa. uses Routes 15 and 30 and passes through Gettysburg, Pa. Another route between the same origin and destination passes near Washington, D.C. and Baltimore, Md. A user of a mapping system may favor one of the two routes. If a user favors the route through Gettysburg, the user may identify a point near Gettysburg to indicate a preference for that route and other routes that pass near the identified point. On the other hand, if the user favors the route near Washington, D.C. and Baltimore, the user may identify a point near Baltimore to indicate a preference for that route or other routes that pass near the identified point. Additionally or alternatively, if the user disfavors a route, the user may identify a point or region to avoid. For example, a user who favors the route through Gettysburg may identify a favored point near Gettysburg and also may identify a disfavored point near Baltimore.

Figure 1:
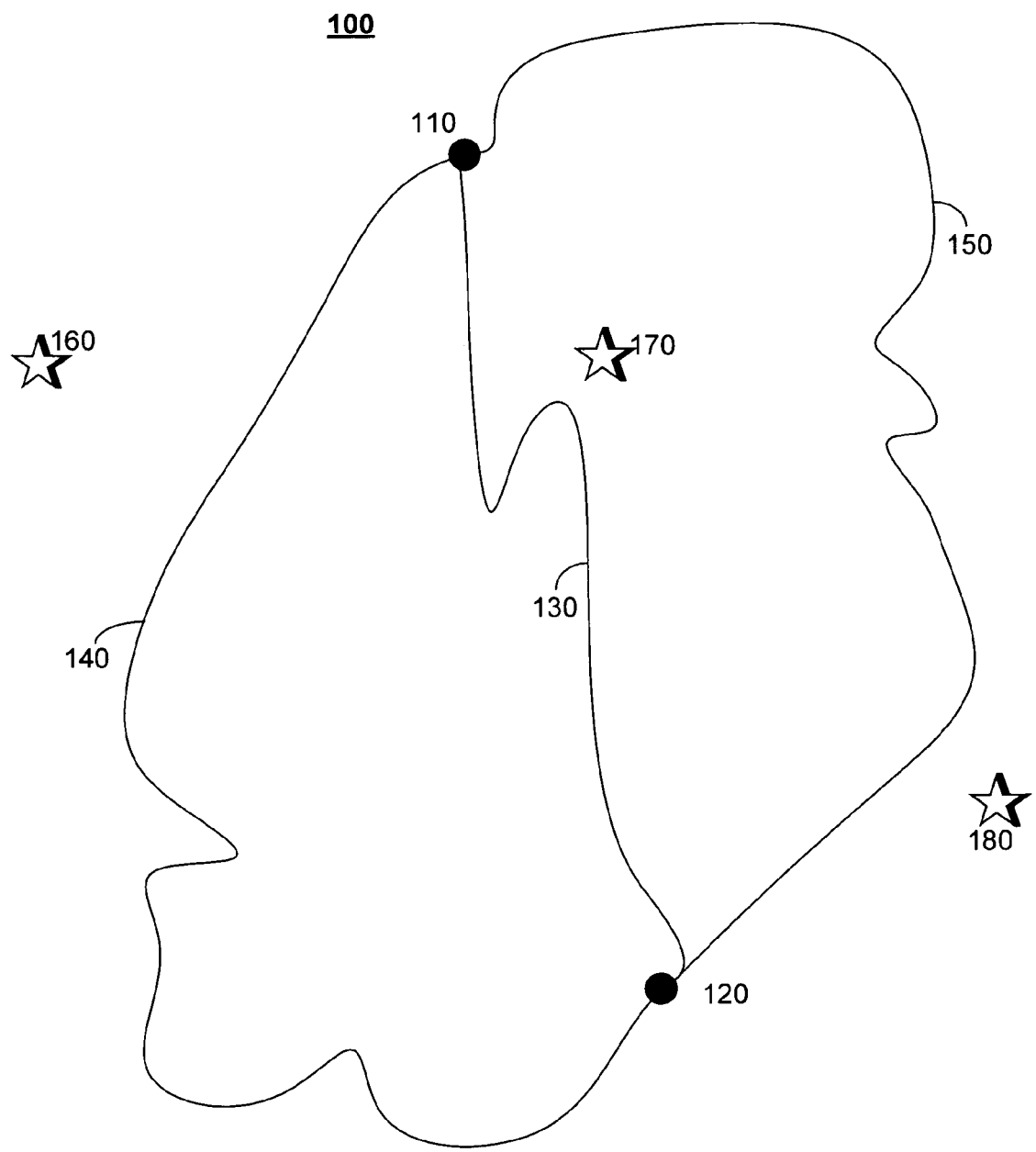
FIGS. 1 and 6 are diagrams of user-selectable alternative routes between an origin and a destination.

FIG. 1 shows alternative routes in a region 100 between an origin 110 and a destination 120. The routes include routes 130, 140, and 150 between origin 110 and destination 120. The route 130 is a central route and is shorter in distance than either of routes 140 or 150. To the west of route 130 is route 140 and to the east of route 130 is route 150, both of which are alternative routes between origin 110 and destination 120. Routes 140 and 150 may be comparable to each other in terms of, for example, the type of road (e.g., a toll road), the total distance (e.g., miles) between the origin and the destination, and the speed limit (e.g., 60 mph). In addition, route 150, for example, may be a route preferred by a majority of users who request a route between the origin and the destination. Nevertheless, the user still may prefer route 140 over route 150 and as such, if the mapping system generates route 150 rather than 140, the mapping system may not be responsive to the user's particular needs even though route 150 may seem perfectly appropriate.

Therefore, to indicate a preference for route 140, the user may identify any region, point or set of points on or near route 140, such as designation 160. The region, point or set of points that influence the route may be referred to as a user designation, or indicia, of a geographic region related to a route from an origin to a destination. For example, the user may identify designation 160 to indicate that the route preferred by the user is towards the west side of map 100. The user may identify designation 160 because the user is aware that route 140 is located in that general direction and desires to travel using route 140. Alternatively, the user may identify designation 160 because the user generally prefers a westerly route.

In some implementations, after the mapping system presents the route generated based on an identified designation, the system enables the user to identify a different designation to further control route selection between the origin and the destination.

In some implementations, a user may identify a designation to identify a geographic region to be disfavored when determining a route between an origin and a destination. For example, if a user has a preference for route 140, the user may identify designation 170, designation 180, or both designations 170 and 180, to indicate that routes 130 and 150, which are proximate to designations 170 and 180, respectively, are to be disfavored in determining the route between origin 110 and destination 120.

In some implementations, general direction preference (e.g., an easterly route) may be identified as a surrogate for a favored (or disfavored) region, point or set of points.

In some implementations, the identified region, point or set of points do not exist until identified by the user. For example, a user may be presented with a map in order to indicate the user's preference for a particular route. The user may use a pointing device (such as a mouse) to identify one or more single points on the map (e.g., by clicking the mouse on particular points on the map) or to identify a region (e.g., by clicking the mouse on an outline of a region (e.g., a state), or by using a shading tool associated with the mouse to color-in a portion of the map). In this case, the user is not presented with a set of pre-determined regions, points or sets of points from among which the user may choose.

Alternatively, one or more particular regions, points or sets of points may be pre-determined and set forth by the mapping system on a map containing an origin and a destination. When indicating a preference for a route between an origin and a destination, a user may select from the one or more pre-determined regions, points or sets of points to indicate the route preference. In yet another implementation, a user may optionally select from one or more pre-determined regions, points or sets of points, and the user may additionally, or alternatively, identify a region, a point or a set of points that is not among the pre-determined regions, points or sets of points.

When this document refers to a user as "identifying" a particular designation, it is to be understood that a user may identify a designation by either selecting from among one or more pre-determined designations or by indicating a designation that was not pre-determined and/or set forth by the mapping system.

Furthermore, a user may identify a point, a set of points, a region, or a general direction to indicate a preference for a particular route between an origin and a destination. If a user identifies a designation other than a particular location or point (e.g., a set of points, a region or a general direction), the mapping system may translate the identified larger geographic area into a particular point to be used as the designation. In some implementations, the mapping system may dynamically generate the designation to be used based on the larger geographic area identified by the user. For example, if a user identifies a region (such as, for example, by indicating a zip code) as a designation, the mapping system may determine a point on the boundary of the region or a point in the center of the region to be used as the designation. In another example, if a user identifies a general direction (e.g., west) as a designation, the mapping system may dynamically generate a point to the west of one, or both, of the origin and destination to be used as the designation. Additionally, or alternatively, the mapping system may store an association between geographic areas and particular points to be used as designations that represent the larger geographic area identified by the user. For example, a user may identify a region (such as, for example, by indicating a zip code), and the mapping system may determine that a particular point is associated with the region, and may use that particular point as the designation.

Figure 2:
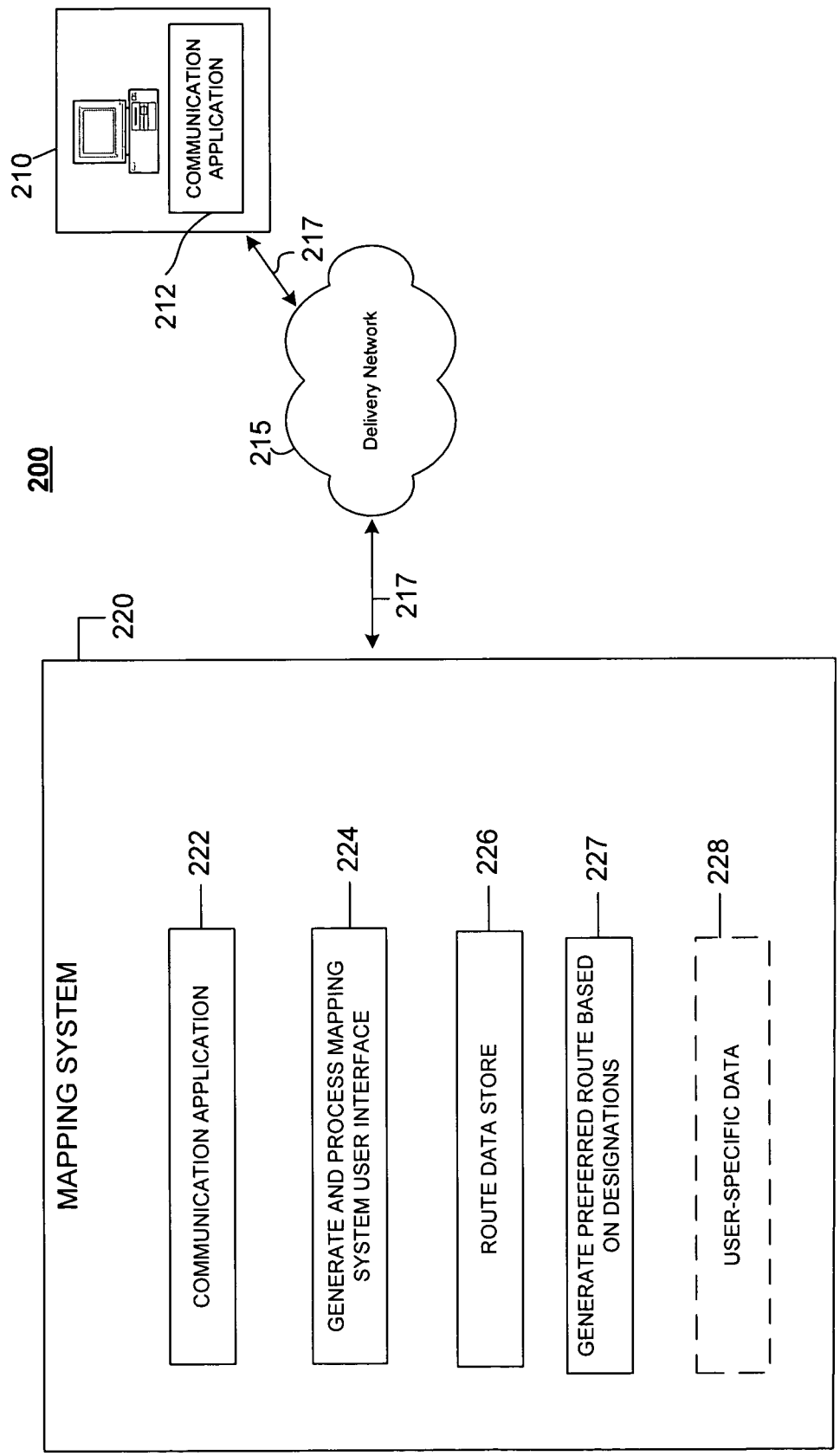
FIG. 2 is a block diagram of a communications system capable of generating a preferred travel route based on a user preference for one route among alternative routes.

FIG. 2 is a block diagram 200 of a communications system capable of generating a travel route based on a user preference for a geographic region or a route among alternative routes. More particularly, the communications system 200 is capable of delivering and exchanging messages between a client system 210 and a mapping system 220 through a delivery network 215 to determine a route based on a user-identified designation of a geographic region to control route selection. In other implementations, the functions of the client system 210 and the mapping system 220 are provided by a single system. For example, the single system may be an on-board navigation system that is located in a vehicle and configured to provide driving directions based on the vehicle's current location. In some implementations, the on-board navigation system also may be capable of communicating with another system, such as, for example, a host system, to receive updated navigation data for use in determining a route or teal-time routing information (such as information about traffic congestion).

Each of the client system 210 and the mapping system 220 may be a general-purpose computer (e.g., a personal computer, a desktop computer, or a laptop computer) capable of responding to and executing instructions in a defined manner. Other examples of the client system 210 and the mapping system 220 include a special-purpose computer, a workstation, a server, a device, a component, other physical or virtual equipment or some combination thereof capable of responding to and executing instructions. The client system 210 also may be a personal digital assistant (PDA), a communications device, such as a mobile telephone, or a mobile device that is a combination of a PDA and communications device.

The client system 210 also includes a communication application 212 and is configured to use the communication application 212 to establish a communication session with the mapping system 220 over the delivery network 215. The communication application 212 may be, for example, a browser or another type of communication application that is capable of accessing the mapping system 220. In another example, the communication application 212 may be a client-side application configured to communicate with the mapping system 220. The client system 210 is configured to send to the mapping system 220 requests for a route identified by an origin location, a destination location, and one or more user-identified designations. The client system 210 also is configured to receive a route from the mapping system 220 and to present the received route to a user.

The delivery network 215 provides a direct or indirect communication link between the client system 210 and the mapping system 220, irrespective of physical separation. Examples of a delivery network 215 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line")), radio, television, cable, satellite, and/or any other delivery mechanism for carrying data.

The delivery network 215 includes communication pathways 217 that enable the client system 210 and the mapping system 220 to communicate with the delivery network 215.

Each of the communication pathways 217 may include, for example, a wired, wireless, virtual, cable or satellite communications pathway.

The mapping system 220 may receive instructions from, for example, a software application, a program, a piece of code, a device, a computer, a computer system, or a combination thereof, which independently or collectively direct steps, as described herein. The mapping system 220 includes a communication application 222 that is configured to enable the mapping system 220 to communicate with the client system 210 through the delivery network 215.

The mapping system 220 may be a host system, such as an Internet service provider that provides a mapping service to subscribers. In another example, the mapping system 220 may be a system that hosts a web site that provides mapping services to the general public. In general, the mapping system 220 is configured to provide a route between an origin and a destination identified by a user. The mapping system 220 is configured to provide a route when alternative routes are available and one or more user-identified designations indicate a user preference for one route over another.

More particularly, the mapping system 220 includes code segments 224 configured to generate and process a mapping system user interface. For example, the mapping system user interface may be any of user interfaces 1000, 1110 or 1130 shown in FIGS. 10 and 11. The mapping system user interface is configured to receive an origin location, a destination location, and a designation that may represent a geographic region to control route selection. A user-identified designation may indicate a geographic region favored by a user for a route. Alternatively or additionally, a user-identified designation may indicate a geographic region disfavored by a user for a route. In some implementations, a user may identify more than one designation of a geographic region to control route selection. For example, one or more identified designations may relate to favored geographic regions and one or more identified designations may relate to disfavored geographic regions. In addition to generating the mapping system user interface, code segments 224 also may cause the information received by the mapping system user interface to be processed, as described in more detail below.

The mapping system 220 also includes a route data store 226. Route data store 226 includes route data for determining alternative routes between an origin and a destination. Route data store 226 also includes route data corresponding to routes that have been determined from a particular origin to a particular destination. The route data store 226 may be stored in persistent or non-volatile storage, though this need not necessarily be so. For example, route data for a particular route may be stored only in memory, such as random access memory, of the mapping system. In some implementations, the route data may be implemented as a collection of links and/or nodes that represent roads and intersections, respectively. In one example, the route data includes a collection of links that represent a route from an origin to a destination.

The mapping system also includes code segments 227 configured to generate a route between an origin and a destination based on one or more designations of geographic regions. More particularly, a route may be generated by code segments 227 by adjusting attributes retrieved from data store 226 and related to alternative routes between an origin and a destination. The attributes may be adjusted to reflect one or more favored or disfavored designations received by code segments 224. Code segments 227 may generate a route by selecting among the alternative routes, and doing so based on the newly adjusted attributes of the alternative routes.

The route may be presented to a user in the form of text, a marked route presented on a map, or a combination of text and a marked route. In some implementations, the route may be presented to the user orally after being generated using a text-to-speech process.

In some implementations, the mapping system 220 may include a user-specific data store 228 that stores information related to route preferences for a particular user. In some implementations, user-specific data store 228 may include a database of previous routes requested by a user between specific origins and destinations. The database also may include user preferences, indicated at the time the user requested the route, regarding which of multiple alternative routes the user preferred. User preferences may include, for example, specific routes between an origin and a destination, general geographic regions related to a route between an origin and a destination (e.g., westerly routes), or specific points of interest that a user wishes to traverse while traveling on a route between an origin and a destination. In other implementations, user-specific data store 228 may include information related to a user's general preferences for particular types of routes (e.g., scenic routes, highways, and non-toll roads).

Figure 3:
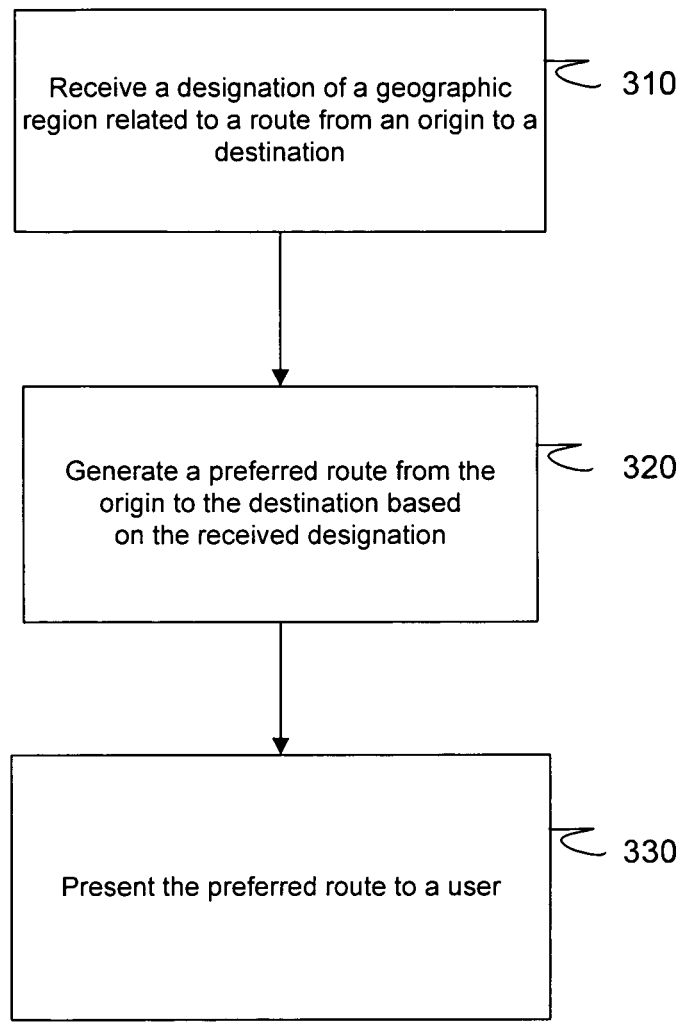
FIG. 3 is a flow chart of a process for presenting a user with a route between an origin and a destination.

FIG. 3 illustrates a process 300 for presenting a user with a route between an origin and a destination. The process 300 may be performed by a mapping system, such as mapping system 220 of FIG. 2.

The mapping system receives a designation of a geographic region related to a route from an origin to a destination (step 310). As described previously, a user may identify a designation to help control, guide, or otherwise influence the determination of a route between an origin and a destination that is favored by the user. In some implementations, general direction preference (e.g., an easterly route) may be identified as a surrogate for a favored (or disfavored) region, point or set of points, and, as such, also may be a designation.

For example, referring again to FIG. 1, a user may prefer route 140 over routes 130 and 150. The user may identify designation 160 to indicate the preference for route 140. Furthermore, the user may additionally or alternatively identify designation 180 to indicate that the user disfavors route 150. Instead of identifying designations 160 and 180, either alone or in combination, the user may also use a pointing device (such as a mouse or a paintbrush tool) to identify the entire west side of map 100 as a favored designation and/or to identify the entire east side of map 100 as a disfavored designation. In each example, the designation is received in step 310.

The mapping system determines a route from the origin to the destination using the received designation of the geographic region to control route selection (step 320). The mapping system may generate a route between an origin and a destination as described below with respect to FIGS. 6, 7A and 7B.

For example, in the case where designation 160 was received in step 310, the mapping system uses designation 160 to control route selection and generates route 140 as the route.

The route is presented to the user (step 330). As has been noted, the route may be presented on a display, and also may be presented orally using a text to speech process.

Figure 4:
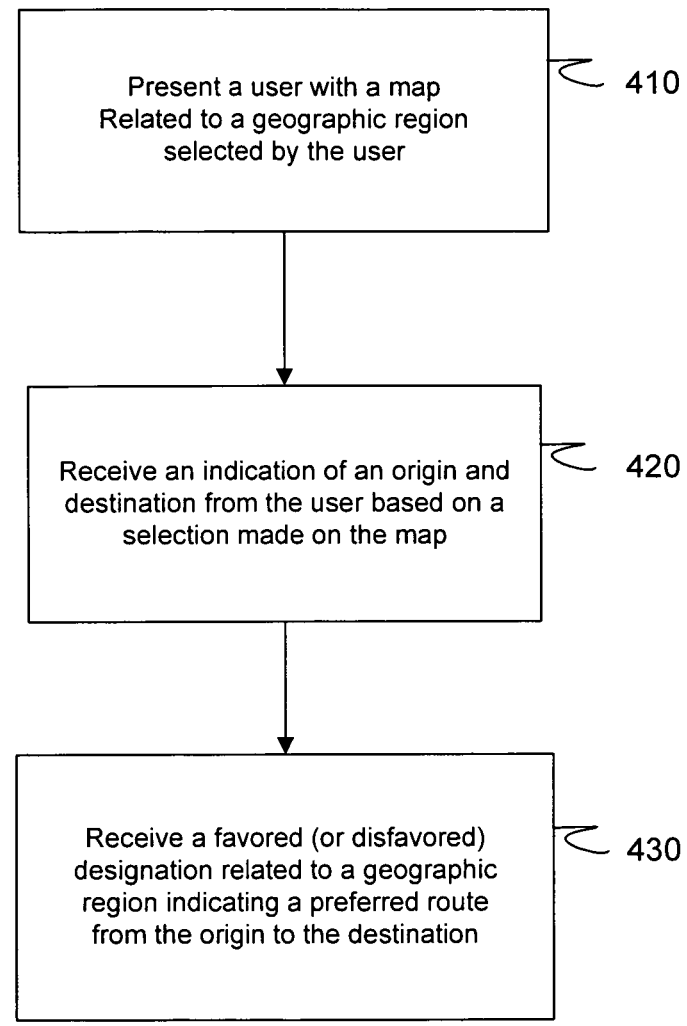
FIG. 4 is a flow chart of a process for generating a route from an origin to a destination based on a received designation of a geographic region.

FIG. 4 depicts a process 400 for receiving a designation of a geographic region to control route selection. The process 400 is one possible implementation of step 310 of FIG. 3. The process 400 may be performed by a mapping system, such as mapping system 220 of FIG. 2.

The mapping system presents a user with a map related to a geographic region selected by the user (step 410). A user may select a geographic region that includes an origin and a destination. In some implementations, a user may be presented with a user interface, such as user interface 1110 of FIG. 11, that permits the user to enter a general geographic region that includes both an origin and a destination. If the origin and destination are not within the same general geographic region, the user may enter a geographic region for each of the origin and destination. If either, or both, the origin and destination are outside the country in which the user is located, a user interface may be presented to the user that is configured to receive information about the general region where the origin and/or destination are located within the other country.

In some implementations, instead of presenting the user with a user interface to enter the general geographic regions where the origin and destination are located, a user may be presented with a large map (e.g., of the United States), such that the user may change the map view (e.g., zoom in or zoom out) until the general geographic regions where the origin and destination are located are visible. If the origin and destination locations are not within the same general geographic region, the user may change the map view multiple times in order to view and select the general geographic regions for each of the origin and destination.

Figure 10:
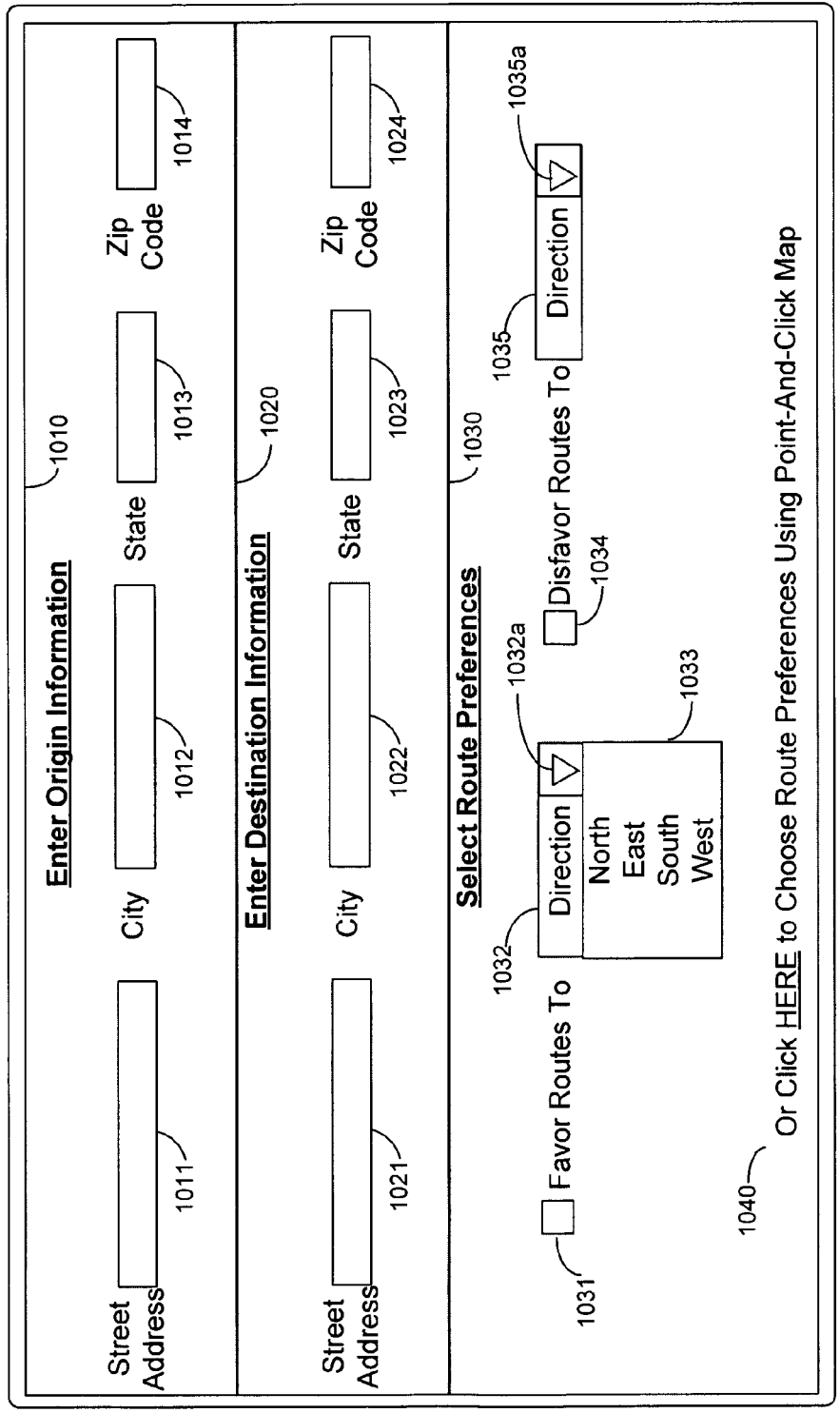

In some implementations, rather than choosing a general geographic region for an origin and a destination, a user may be presented with a user interface, such as user interface 1000 of FIG. 10, to enter specific origin and destination locations. For example, a user may be presented with a user interface such that the user may enter a street address, city, state, or zip code (or other information related to a location) for each of the origin and destination. Alternatively, a user may enter specific location information for one of the origin or destination and may select a general geographic region for the other of the origin or destination, as described previously.

In some implementations, rather than selecting a general geographic region for an origin and a destination by changing a view of a large map presented to the user (e.g., a map of the entire United States), a user may directly select an origin and a destination by further manipulating the view of the map. For example, a user may zoom in or out until the specific origin and destination are visible. Again, if the origin and destination locations are not within the same general geographic region, the user may change the map view multiple times in order to view and select each of the origin and destination locations.

The mapping system receives a designation of an origin and a destination from the user based on a selection made using at least one of the methods described above (step 420). In some implementations, once the user has entered the general geographic locations for the origin and destination, or otherwise, indicated the general geographic locations on a map, the mapping system may present the user with a map showing both the origin and destination locations. In one implementation, if the origin and destination locations are very far apart (e.g., an origin location of West Palm Beach, Fla. and a destination location of Seattle, Wash.), the user may have the option of being presented with multiple maps showing locations between the origin and the destination.

The mapping system receives a designation of a geographic region indicating a favored (or disfavored) direction or location for a route between the origin and the destination (step 430). As described previously, a user may identify a designation to indicate a preference for one route among several alternative routes between an origin and a destination, or, instead, the user may indicate a preference for a direction where a route should be located.

A user may identify a designation on the map presented to the user in step 420, such as by using the approach described below with respect to user interface 1130 of FIG. 11. For example, once a user is presented with a map showing both an origin and a destination, the user may identify a destination directly on the map using a pointing device.

In some implementations, a user may additionally or alternatively identify a designation, such as a particular direction to be favored (or disfavored) in generating a route, by entering a direction into a user interface, such as user interface 1000 of FIG. 10. In some other implementations, a user may identify such a designation by entering the location of an exact point (e.g., by street address, city, state, or zip code) into a user interface. In still other implementations, a user may identify such a designation by choosing a region from a list of predetermined regions provided to the user in a user interface.

Figure 5:
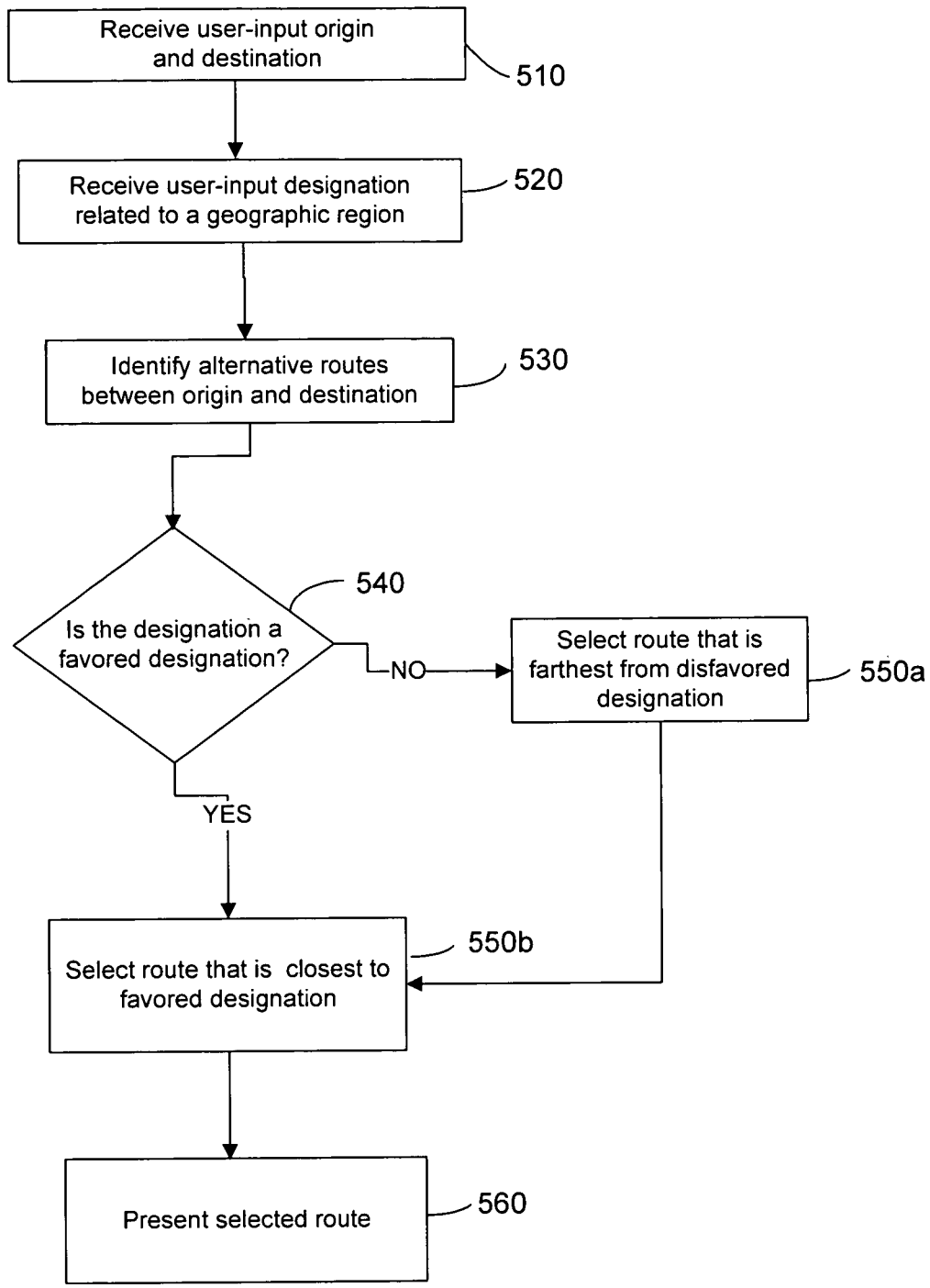
FIG. 5 is a flow chart of a process for receiving a designation of a geographic region related to a route from an origin to a destination.

FIG. 5 shows another example of a process 500 for generating a route from an origin to a destination based on a designation of a geographic region received from a user. The process 500 may be performed by a mapping system, such as the mapping system 220 of FIG. 2.

The mapping system receives an origin and a destination as entered by a user (step 510) and also receives a user-identified designation related to a geographic location to control route selection (step 520). A user may enter an origin, a destination, and a designation of a favored (or disfavored) route or direction by using a map, a user interface, or a combination of the two, such as described below with respect to FIGS. 10 and 11.

In the example of process 500, the mapping system identifies alternative routes that exist between the origin and the destination (step 530). For example, and referring again to FIG. 1, the mapping system may identify routes 130, 140 and 150. The mapping system may identify all or a substantial majority of routes that exist between the origin and the destination, though this need not necessarily be so. In some implementations, alternative routes between an origin and a destination may be generated on an ad hoc basis from road information stored by the mapping system. Alternatively, or additionally, known routes between an origin and a destination may be stored and identified as needed, rather than being generated on-the-fly. In some implementations, routes between popular origins and destinations may be stored and identified as needed, while routes between less popular origins and destinations are generated as needed.

The mapping system determines if a designation is a favored designation (step 540). As described previously, a user may identify a designation to indicate a route that is favored by the user, or alternatively to indicate a route that is disfavored by the user. In addition, a user may identify more than one designation, such that some of the designations indicate a favored route and some indicate a disfavored route.

For example, and referring again to FIG. 1, a user may prefer route 140 (or the user may prefer to travel in a westerly direction) over routes 130 and 150. To indicate this preference, the user may identify designation 160 as a favored designation. Additionally or alternatively, the user may identify designation 180 as a disfavored designation.

In some implementations, to indicate that a particular designation is favored or disfavored, a user may, for example, choose a particular tool (e.g., a designation type tool), when identifying the designation on a map. For example, a user may direct a pointing device to click on a "favor route here" button. The user's screen pointer may take on the shape of the letters "FR" in a box instead of a typical arrow. Any designation the user thereafter identifies may be associated with being favored. Similarly, the user may click on a "disfavor route here" button, such that the user's screen pointer may take on the shape of the letters "DR" in a box. Again, any designation the user thereafter identifies may be associated with being disfavored.

In some other implementations, a user may indicate whether a particular designation is favored or disfavored by entering information into a user interface, choosing from a drop-down menu (either on a user interface or a map), or by some other means.

If the designation is determined to be a favored, the mapping system selects a route closest to the favored designation (step 550a). When the designation is not a favored designation (e.g., is a disfavored designation), the mapping system may select a route that is farthest away from the disfavored designation (step 550b).

The route selected in step 550a or step 550b; depending on the type of user-identified designation received in step 520, is presented by the mapping system (step 560).

As described above, a user may identify more than one designation to indicate a preference for a particular route. For example, and referring again to FIG. 1, a user may identify designation 160 as a favored designation and designation 170 as a disfavored designation in order to indicate a preference for route 140. In this case, the mapping system may receive the more than one user-identified designations in step 520 and may process the designations separately or together in order to select the route such that each of the designations informs the route selection equally.

Figure 6:
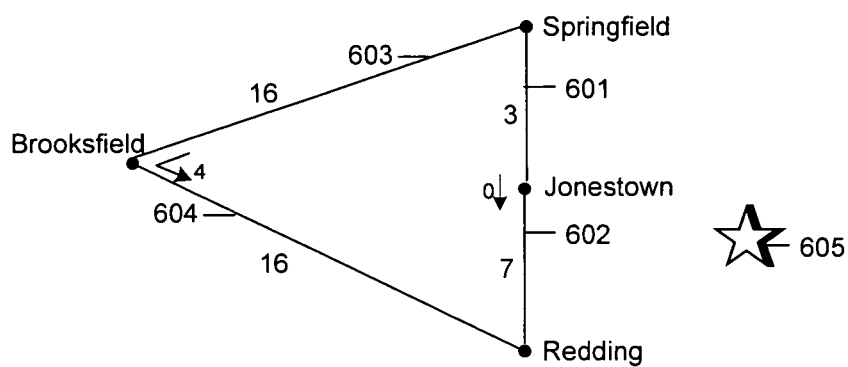
Figure 7A:
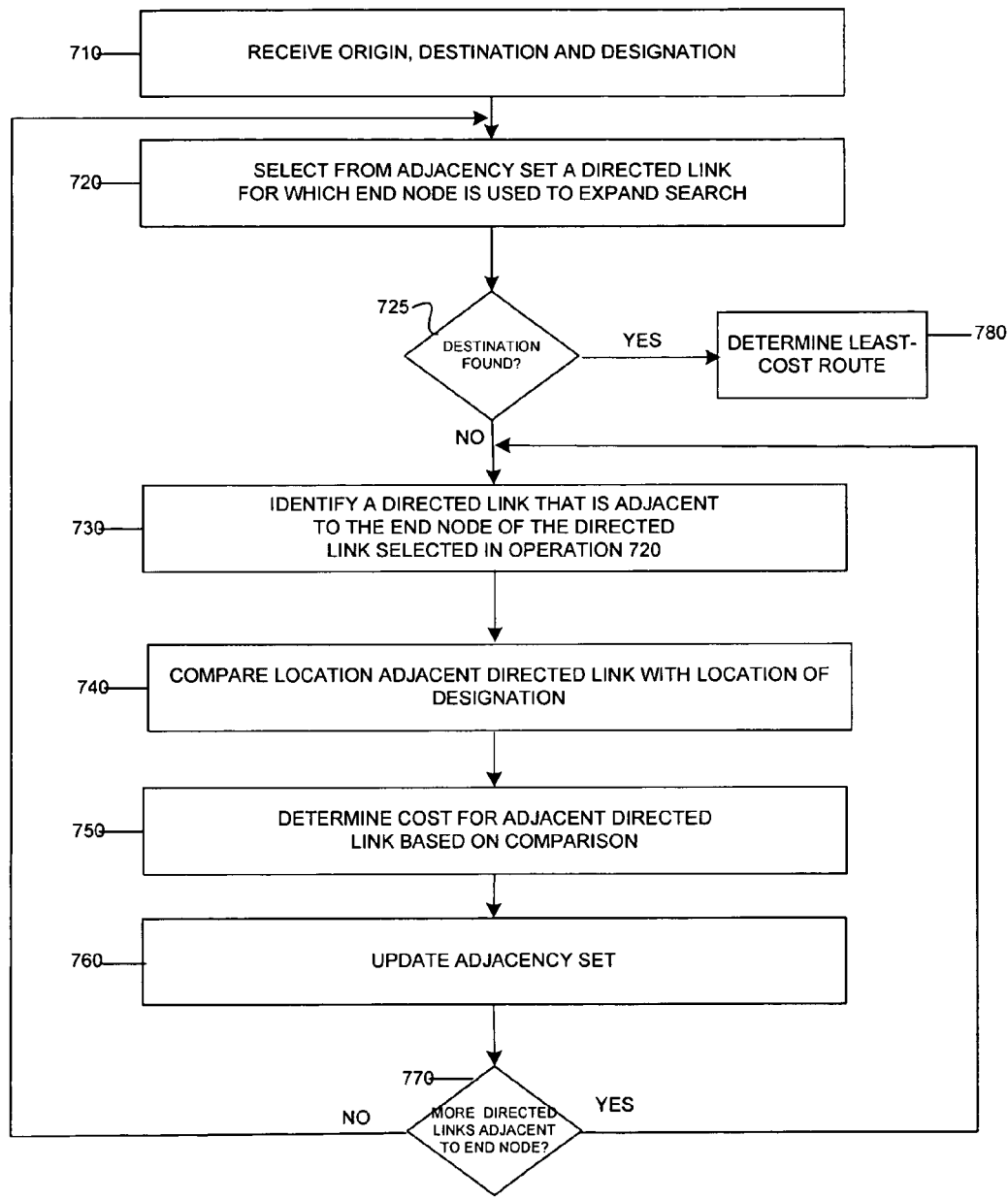
FIG. 7A is a flow chart of a process for generating a route from an origin to a destination based on a routing graph and using links and nodes.
Figure 7B:
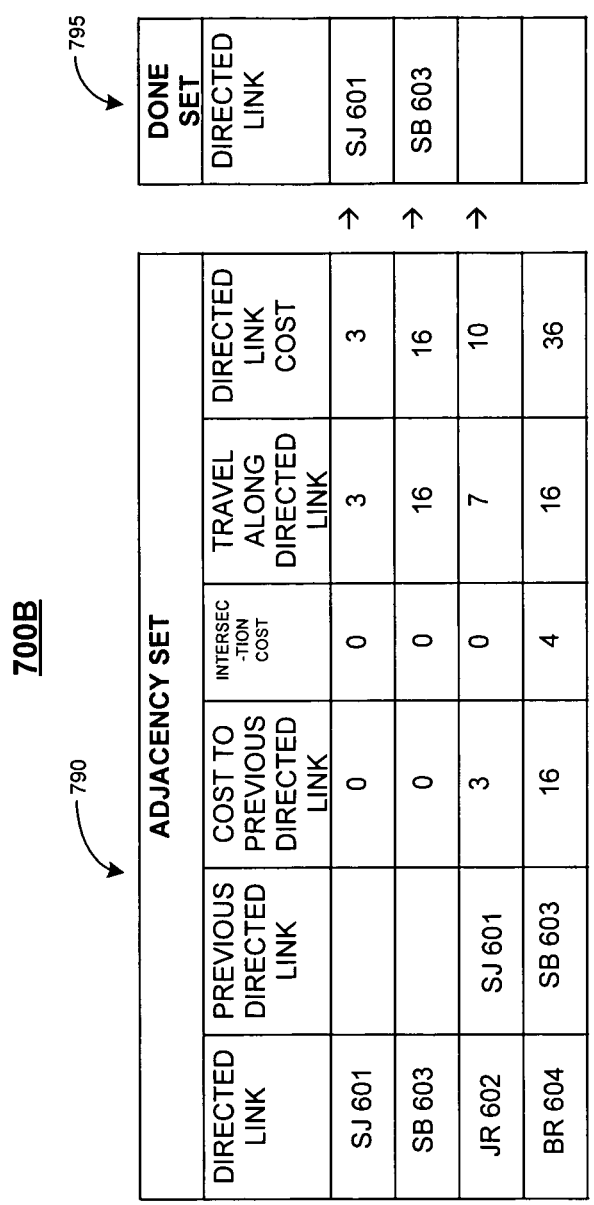
FIG. 7B is a block diagram that illustrates the results of generating a route.

Referring to FIGS. 6, 7A and 7B, an exemplary process 700A is used by a mapping system to generate a route from an origin to a destination on a routing graph 600 by using links and nodes. The generation of a route also may be referred to as a search for a route. In some cases, a route may be an optimal route based on time and/or distance traveled. In other cases, a route may be a non-optimal route. For example, a route that circumvents an urban area in response to a user-identified designation may be preferred even when the route is longer than a corresponding urban route.

In general, FIG. 6 is a routing graph 600 that includes a collection of links and nodes. More particularly, routing graph 600 includes a Springfield node (S), a Jonestown node (J), a Redding node (R) and a Brooksfield node (B). Routing graph 600 also includes links 601-604 and user-identified designation 605.

Each node represents a particular city. The connections between the nodes are referred to as links and are represented by a line (or edge) that connects two nodes. Each link represents one or more particular roads. In some implementations, a link represents a road that may be traveled in either direction (e.g., from the S node to the J node or vice versa). In other implementations, a link may be a directed link, such that the road represented by the link may only be traveled in one direction (e.g., a directed link between the S node and the J node may only be traversed from Springfield to Jonestown). A directed link may be referenced using an ordered pair of nodes where the order of the nodes corresponds to the direction of travel. For example, a line between node S and node J includes two directed links, namely a directed link from S to J that may be referred to as directed link SJ, and another directed link from J to S that may be referred to as directed link JS. Although FIGS. 6, 7A and 7B are discussed with respect to directed links, it is important to note that the mapping system may generate a route between an origin and a destination using non-directed links in a manner similar to that described for the use of directed links Link 601 represents a road that connects Springfield with Jonestown. Link 602 represents a road that connects Jonestown with Redding. Link 603 represents a road that connects Springfield with Brooksfield. Link 604 represents a road that connects Brooksfield with Redding.

Each of links 601-604 has a cost associated with traversing the link. As shown in routing graph 600, link 601 has a cost of 3, link 602 has a cost of 7, and links 603 and 604 each have a cost of 16. The cost associated with a particular link is a representation of the benefit of traversing the link as opposed to traversing a different link. For example, the lower cost associated with link 601, as opposed to link 603, may indicate that link 601 has a shorter distance between nodes (e.g., between the Springfield node and the Jonestown node) than link 603.

The cost associated with traversing a link may be a predetermined cost value for traversing the link. The cost also may be a cost value that is determined based on a formula. For example, a cost may be determined based on the length of the link multiplied by a reciprocal of an estimate of an assumed travel speed. The assumed travel speed may be multiplied by a factor that favors or disfavors the link in the determination of a route.

In some implementations, the mapping system may include a cost associated with a link based on the density of the links within a predetermined area in which the link is located. The mapping system may include a density cost as part of the cost for traversing the link. For example, a routing graph or a geographical area may be divided into equal-sized areas. The equal-sized areas may be referred to as tiles. A tile may be based on longitude and latitude coordinates. The density of a particular tile may be determined based on the number of links that are included in the tile. The density of one tile may be compared with the density of a different tile. A cost associated with traversing a particular link may reflect the density of the tile in which the link is located. For example, a link in a lower density tile may be given a lower density value than the density value given to a different link located in a tile with a higher density of links. A mapping system that includes a density value may permit the determination of a route based on a preference for routes that occur through lower density regions. Lower density regions may correspond to rural routes, and higher density regions may correspond to urban routes.

Intersections (e.g., transitions between links) are also associated with a cost. For example, and as shown in routing graph 600, the Jonestown intersection has a cost of 0 and the Brooksfield intersection has a cost of 4.

Routing graph 600 also includes designation 605. As described previously with respect to FIG. 1, a user may identify a designation, such as designation 605, to indicate a preference for the route from Springfield to Redding that goes by way of Jonestown. In general, the effect of designation 605 is to cause the cost for traversing a link that is proximate to the designation to be adjusted.

Absent any such designation, the route from Springfield to Redding, by way of Brooksfield, may be the generated route if it had the lowest link and intersection costs of the alternative routes between Springfield and Redding prior to the costs being adjusted in response to the user identified designation. However, the cost values indicated on routing graph 600, and used in conjunction with other figures in this discussion, are assumed to be the post-adjustment costs (e.g., the link costs after designation 605 has been taken into account and the costs adjusted appropriately). Thus, the route that goes by way of Jonestown may be generated because the link and intersection costs for the route that travels by way of Jonestown are lower (as indicated) than those for the route that travels by way of Brooksfield.

FIG. 7A illustrates a process 700A to generate a route using directed links. The process may be performed by a mapping system, such as, for example, mapping system 220 of FIG. 2.

The results of 700B generating a route using directed links are illustrated in FIG. 7B. Data 700B includes an adjacency set 790 that includes one or more directed links that have been identified by the mapping system as adjacent (or otherwise near) a particular portion of the routing graph 600 (e.g., adjacent to an end node of a particular directed link). The adjacency set 790 also may be referred to as a priority set. The adjacency set may be organized as a data set, a database table, an object instance, a linked list, a XML-document, a text file, or another data structure. The data structure may be stored in persistent or transient storage, including a portion of memory of the mapping system.

Data 700B also includes a done set 795 that includes one or more directed links for which processing has been completed. The done set 795 also may be referred to as a completed set. A particular directed link is added to the done set 795 when the mapping system has completed processing of the particular directed link. The mapping system begins the route generation process with the adjacency set 790 and the done set 795 empty of directed links.

In general, to generate a route, the mapping system processes a particular directed link from a set of directed links (i.e., the adjacency set) by identifying one or more directed links that are adjacent to the end node of the particular directed link. For each directed link, the mapping system determines a cost associated with the directed link and adds the directed link and its associated cost to the set of directed links. The mapping system continues to select a directed link from the set and to identify one or more directed links that are adjacent (e.g., expanding the search set) until the destination has been reached or found. The system determines that the destination has been reached, for example, when one or more identified directed links include the destination as an end node. The route is generated based on the collection of identified directed links that has the lowest cost.

In the process 700A, an origin, a destination and a designation are received or otherwise obtained by the mapping system (step 710). The designation received may be related to a point, set of points or a region identified by a user. The origin received may be a directed link or a node that is associated with an origin location from which the route is to start. Similarly, the destination received may be a directed link or a node associated with a destination location at which the route is to end.

For example, when a route is generated from the Springfield node S to the Redding node R, as shown in routing graph 600, node S is received as the origin and node R is received as the destination. In addition, designation 605 of routing graph 600 is received as the user-identified designation.

The mapping system selects a directed link from the adjacency set (step 720). The end node of the selected directed link is used as a focus point from which one or more adjacent directed links are identified, processed, and added to the adjacency set. This may be referred to as expanding the search or expanding the adjacency set.

Figure 8A:
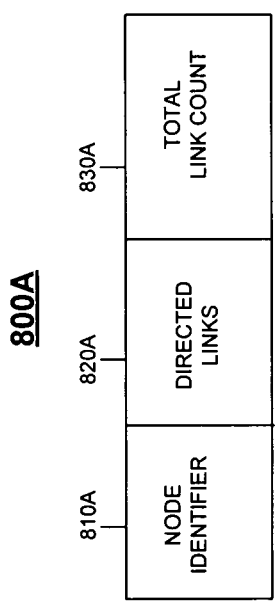
FIGS. 8A and 8B are block diagrams of example data structures used in determining a route.
Figure 8B:
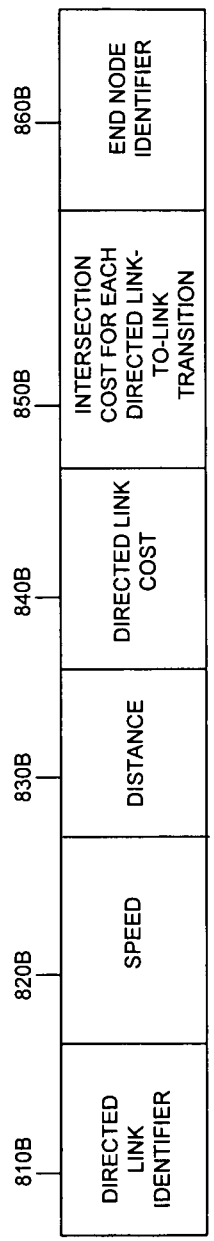

For example, the mapping system may access node information for node S, such as data structures 800A and 800B of FIGS. 8A and 8B, respectively, to determine that the directed links SB 603 and SJ 601 are adjacent to node S. The mapping system adds the directed links SB 603 and SJ 601 to the adjacency set.

For each of directed links SB 603 and SJ 601, the mapping system determines a directed link cost in order to determine which of directed links SB 603 and SJ 601 has the lowest cost so that the search may be expanded from the lowest cost link. In some implementations, the mapping system may not expand the search from the lowest cost link, but rather from a link chosen in some other manner. Because the total cost for each route generated (and/or determined) between the origin and destination is calculated at the end of process 700, before a particular route is generated and presented as the user's preferred route between the origin an destination, the first link chosen to expand the search does not affect the final generation of the route between the origin and destination.

Specifically, the mapping system determines the total cost at the directed link by summing the previous cost to get to the start node of the directed link, an intersection cost associated with traveling through the intersection of the previous directed link and the directed link, and a cost associated with traversing the directed link.

Before the directed link cost may be determined, the cost associated with traversing the directed link may be adjusted depending on the proximity of the directed link to the user-identified designation. The mapping system may compare the location of the directed link with the location of the designation to determine whether the directed link is proximate or not proximate to the designation. In some implementations, the mapping system also may determine a degree of proximity between the directed link and the designation. The cost associated with traversing a directed link that is proximate to a designation may be adjusted, while the cost associated with traversing a directed link that is not proximate to a designation may not be adjusted. Furthermore, the amount the cost may be adjusted depends on the degree of proximity, and whether the designation is a favored or disfavored designation.

Since the directed link SB 603 includes the origin node S as the starting node, the cost for the previous directed link is zero because there is no previous link, as is the intersection cost. The cost to traverse directed link SB 603 is 16 as shown in FIG. 6, which as noted above, is the post-adjustment cost for directed link SB 603. The mapping system associates the directed link cost of 16 with the directed link SB 603 in the adjacency set 790. Similarly, the mapping system determines a directed link cost of 3 for directed link SJ 601, as the post-adjustment cost for traversing directed link SJ 601, as also shown in FIG. 6. Because the directed link SJ 601 also emanates from the starting node S, there is a zero directed link cost for the previous link and a zero intersection cost. Thus, the mapping system associates the directed link cost of 3 with the directed link SJ 601 in the adjacency set 790.

The mapping system selects directed link SJ 601 (particularly, end node J) to use as a focus point in expanding the adjacency set, and does so because directed link SJ 601 has the lowest cost of the directed links SB 603 (with a directed link cost of 16) and SJ 601 (with a directed link cost of 3) in the adjacency set.

For the directed link selected from the adjacency set (step 720), the mapping system determines whether the destination has been found or identified (step 725). For example, the mapping system determines whether the selected directed link corresponds to the received destination directed link. The mapping system also may determine whether the selected directed link has an end node equal to the destination end node. In some implementations, the directed link may be added to the done set upon being selected.

Upon determining that the destination (i.e., node R) has not been found (step 725), the mapping system identifies a directed link that is adjacent to the end node of the selected directed link (step 730). The identified directed link may be referred to as an adjacent directed link.

For example, the mapping system accesses node information for node J to determine that directed link JR 602 and JS (not labeled) are adjacent to directed link SJ 601, as shown in FIG. 6. In the described implementation, the mapping system does not process directed link JS because directed link JS requires a U-turn and does not advance the route. Thus, the mapping system selects directed link JR 602 as the adjacent directed link. Other implementations may process directed link JS in the same manner as the mapping system processes directed link JR 602.

Figure 9:
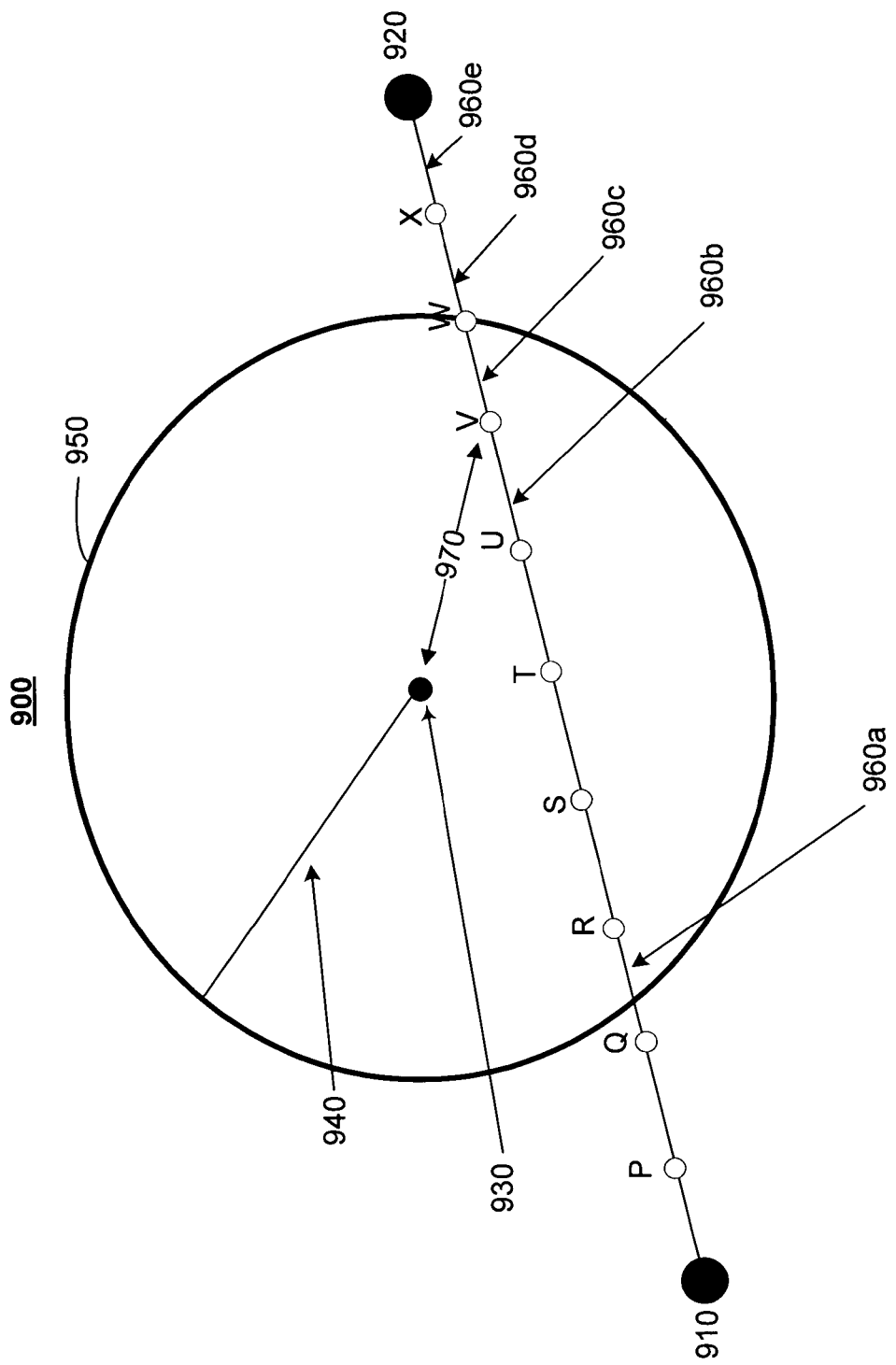
FIG. 9 is a block diagram illustrating the effect of a user-identified designation on nearby links.

The mapping system compares the location of the adjacent directed link with the location of the designation received in step 710 (step 740). As a result of the comparison, the mapping system may determine that the adjacent directed link is proximate to the designation or not proximate to the designation. Furthermore, in some implementations, the mapping system may determine a degree of proximity between the adjacent directed link and the designation. This degree of proximity may be represented, for example, by the distance between the location of the adjacent directed link (e.g., the location of at least one node of the adjacent directed link) and the designation, as illustrated in FIG. 9.

A cost for the adjacent directed link is determined by the mapping system based on the comparison (step 750). The cost of traversing a directed link may be adjusted (based on the comparison) before the total cost, which includes the cost from the origin to the previous directed link, the intersection cost and the cost associated with traversing the instant directed link, is determined.

The cost from the origin to the previous directed link may be determined based on the accumulated cost associated with the previous directed link. Alternatively, the cost from the origin to the previous directed link may be determined based on a stored aggregate cost of the each particular route that is included in the search process.

The mapping system may determine the intersection cost associated with traveling through the intersection of the previous directed link and the adjacent directed link, for example, based on directed link information stored in a table or list that includes an intersection cost associated with a particular turn in an intersection. Alternatively or additionally, the mapping system may make the determination of an intersection cost for an intersection, for example, based on the dynamic execution of a process. The use of an intersection cost may result in a route that has fewer maneuver changes (e.g., the route may tend to stay on the same roads longer) than if an intersection cost was not included in the cost of the route.

The cost for traversing an adjacent directed link may be adjusted to reflect the comparison between the locations of the adjacent directed link and the designation. In some implementations, the cost for an adjacent directed link that is proximate to the designation (e.g., an adjacent directed link located within a certain distance from the designation) may be decreased, while the cost for an adjacent directed link that is not proximate to the designation (e.g., an adjacent directed link that is located outside a certain distance from the designation) may not be adjusted at all. In other implementations, the cost for an adjacent directed link that is proximate to the designation may be adjusted by increasing the cost, while the cost for an adjacent directed link that is not proximate to the designation may be adjusted by decreasing the cost or vice versa.

Furthermore, and as described below with respect to FIG. 9, adjacent directed links that are proximate to the designation may be adjusted based on the degree of proximity of the location of the adjacent directed link relative to the location of the designation.

As noted above, for purposes of this discussion, it is to be assumed that all directed link costs shown in FIG. 6 and described with respect to FIG. 7B have already been adjusted based on the designation type (e.g., favored or disfavored) and the proximity of the directed link to designation 605 of FIG. 6.

For example, the mapping system determines the cost for directed link JR 602. The cost from the origin (here, S) to the previous directed link (here, SJ 601) is 3 as reflected in the cost associated with directed link SJ 601 in the adjacency set. The mapping system adds the intersection cost associated with traveling through the intersection of directed link SJ 601 and directed link JR 602. Here, the route travels straight through node J. The intersection cost associated with traveling straight through node J is 0, as shown in FIG. 6. This intersection cost of 0 may reflect, for example, that a road name change does not occur and that the road that corresponds to directed link SJ 601 and directed link JR 602 is a U.S. highway, as described above. The cost of traversing the adjacent directed link (here, JR 602) is 7, as shown in FIG. 7A.

The mapping system updates the adjacency set (step 760) once the mapping system has determined a cost for the adjacent directed link (including the adjusted cost for traversing the adjacent directed link). When the adjacent directed link is not included in the adjacency set, the mapping system updates the adjacency set by adding the adjacent directed link to the adjacency set and associating the cost determined in 750 with the adjacent directed link in the adjacency set. When the adjacent directed link is included in the adjacency set, the mapping system updates the adjacency set by first comparing the cost associated with the adjacent directed link in the adjacency set to the cost determined in step 750 for the adjacent directed link. The mapping system updates the adjacency set by updating the cost associated with the adjacent directed link with the cost determined for the adjacent directed link in 750 (step 760). In some implementations, this update may not be performed unless the cost determined in 750 for the adjacent directed link is less than the cost associated with the adjacent directed link in the adjacency set. For example, the mapping system associates a cost of 10 with directed link JR 602 in the adjacency set 790.

The mapping system determines whether more directed links adjacent to the end node that is the focus point are to be processed (step 770). If so, the mapping system proceeds to identify a directed link that is adjacent to the end node (step 730), as described above. If not, the mapping system selects a directed link from the adjacency set (step 720) and proceeds as described previously.

For example, the mapping system may determine that no more directed links are adjacent to node S. The mapping system moves the directed link SJ 601 from the adjacency set 790 to the done set 795. This may help improve the efficiency of determining a route. For example, moving a directed link from the adjacency set 790 to the done set 795 may permit the mapping system to select the first directed link in the adjacency set without determining whether the first directed link has been processed (e.g., the directed links adjacent to the end node of the directed link have been identified and a cost has been associated with each adjacent directed link).

If no additional directed links are adjacent to the end node (step 770), the mapping system may select a directed link for which the end node is used to expand the search in a different direction (step 720) and proceed through steps 730-770 for the next node.

The mapping system selects directed link SB 603 (particularly, end node B) to use as a focus point in expanding the adjacency set. The mapping system selects directed link SB 603 because directed link SB 603 has the least cost of the directed links remaining in the adjacency set (e.g., the directed links that have not yet been processed). The mapping system also may determine that directed link BS (not labeled) is adjacent to node B. The mapping system does not process directed link BS because directed link BS requires a U-turn from node B and, as such, does not advance the route.

The mapping system determines that the destination node R of FIG. 6 has not yet been identified.

The mapping system accesses node information to determine that directed link SB 603 is adjacent to directed link BR 604. The mapping system determines the directed link cost for the directed link BR 604. The cost from the origin to the previous directed link (here, SB 603) is 16, based on the directed link cost of SB 603 in the adjacency set. The intersection cost associated with traveling through the intersection of SB 603 to BR 604 is 4, as shown in FIG. 6. This intersection cost may be based on the types of roads that intersect or other intersection costing factors and condition information. The cost to traverse directed link BR 604 is 16. The directed link cost for BR 604 is thus 36. The mapping system associates the directed link cost of 36 with directed link BR 604 in the adjacency set 790.

The mapping system determines that no more directed links are adjacent to node B. The mapping system moves the directed link SB 603 from the adjacency set 790 to the done set 795.

At this point, the mapping system determines that the destination has been found or identified (step 725). For example, upon processing directed links JR 602 and BR 604, the mapping system determines that the destination node R has been identified, such as in step 725 of FIG. 7A. In some implementations, the mapping system may continue to search for a route even after identifying the destination node. A mapping system may continue to search even after identifying the destination node because the first route identified may not be the best route or because the first route identified is not closer to the designation than another alternative route that may exist. In some implementations, particularly in implementations that move each selected directed link to the done set, the mapping system may continue processing a selected route until the directed link that includes the destination end node is placed in the done set. For example, the mapping system may continue processing until the directed link JR 602 or BR 604 is placed in the done set 795.

The mapping system determines the least-cost route (step 780). The mapping system may determine the least-cost route by tracing back through the adjacent directed links that comprise the route. For example, the mapping system may trace back through the adjacent directed links that comprise the route through the use of information that identifies the previous directed link for each directed link in the adjacency set.

For example, the mapping system traverses from directed link BR 604 to directed link SB 603, which includes the origin node S as a starting node. The mapping system also may traverse from directed link JR 602 to directed link SJ 601, which also includes the origin node S as a starting node. The mapping system may traverse the directed links, for example, by storing the previous directed link for each directed link in the adjacency set 790. Some implementations may use other software engineering methods, processes, and/or techniques to traverse the directed links that are included in the route. The least-cost and route traverses SB 603 and JR 602.

Some implementations may use other software engineering methods, processes and/or techniques to determine the cost from the origin to a previous directed link when determining the directed link cost of a particular directed link. For example, the mapping system may traverse the links from the previous link to the origin and accumulate the directed link cost for the each link traversed.

In some implementations, the adjacency set and done set may be simple lists or sorted lists. In such implementations, clearing the information associated with previous route determinations may be straightforward. Other implementations may store temporary information per node or directed link in the route network. The temporary information may describe whether a particular node or particular directed link belongs to an adjacency set, a done set, or neither the adjacency set nor the done set. The temporary information also may describe the associated cost and predecessor information for a node or directed link. In such implementations, the time to determine a route may be reduced when the mapping system does not clear or initialize the associated cost and/or predecessor directed link in the temporary information before beginning the determination of a route. The determination of a route is not affected because the mapping system associates a cost and predecessor directed link when the directed link is processed (e.g., the cost and predecessor directed link from a previous route determination are overwritten with the cost and predecessor directed link associated with the current route determination process).

For example, temporary information may include, for each directed link, an associated cost, a predecessor directed link, and an indication of whether the directed link has been processed (e.g., moved to a done set or the adjacency set). The temporary information also may include an adjusted cost based on a current user-identified designation. The mapping system may prepare the temporary information for the start of a new search by modifying each indicator to indicate that the directed link to which the indicator relates has not been processed (not in either the adjacency nor done set). The cost and predecessor directed link information from the prior route determination process may be modified (e.g., overwritten) by the subsequent route determination process, for example, based on the existence of a user-identified designation. This may provide efficiency improvements over an implementation that removes, deletes, or otherwise clears the entire temporary information before starting a new search. Similarly, efficiency improvements may occur when only portions of the temporary information are cleared from the mapping system memory or other data storage device.

Some implementations may select a particular node in step 720 and identify a directed link that is adjacent to the selected node in step 730. In other words, the mapping system may process nodes rather than links to generate the route.

The previous discussion of FIGS. 6, 7A and 7B includes the use of directed links in generating a route between an origin location and a destination location. However, this description of route generation is for illustrative purposes only. In many implementations, the mapping system may generate a route using non-directed links, in a manner similar to that described previously with respect to FIGS. 6, 7A and 7B.

Furthermore, the previous discussion of decreasing costs of links that are proximate to a designation, such as designation 605 of FIG. 6, is relevant for designations that are favored designations. If a designation is a disfavored designation, link costs may be increased in the same or similar manner.

FIG. 8A is an example of a data structure 800A for node information. Node information may be used by one or more steps in the generation of a route. The data structure 800A represents an example of how node information may be organized. In general, the node information in data structure 800A is used in a process to generate a route, such as process 700A of FIG. 7A. In some cases, the node information in data structure 800A or portions of the node information in data structure 800A may be created and stored using data structure 800A during a process to generate a route. This may be referred to as the dynamic generation of node information.

The node information data structure 800A includes a node identifier 810A, directed links 820A and a total link count 830A. The node identifier 810A uniquely identifies the particular node. Directed links 820A identify the directed links that are adjacent to the node. For example, directed links 820A may include a list of the directed link identifiers that are adjacent to the node. Directed links 820A also may point to a position in a directed link index that is associated with the first directed link that is adjacent to the node. When the directed link index is organized so that the directed links adjacent to a particular node are linked, additional directed links that are adjacent to the node also may be identified. The total link count 830A indicates the total number of links that are adjacent to the node. In some implementations, the node identifier 810A may be determined based on the position information of the node relative to one or more other nodes and/or one or more directed links.

FIG. 8B is an example of a data structure 800B for directed link information. Directed link information may be used in the generation of a route. The data structure 800B represents an example of how directed link information may be organized. In general, the directed link information in data structure 800B is used in a process to generate a route, such as process 700A of FIG. 7A. In some cases, the directed link information in data structure 800B, or portions of the directed link information in data structure 800B, may be created and stored using data structure 800B during a process to generate a route. This may be referred to as the dynamic generation of directed link information.

The directed link data structure 800B includes a directed link identifier 810B, a speed 820B, a distance 830B, a link cost 840B, an intersection cost for each directed-link-to-link transition 850B, and an end node identifier 860B. The directed link identifier 810B uniquely identifies a particular directed link. The speed 820B identifies an average speed for traversing the directed link. The distance 830B indicates the distance to traverse the directed link. Collectively, the speed 820B and the distance 830B may be used to determine a cost to traverse the directed link, such as directed link cost 840B. Some implementations may include only speed 820B and distance 830B in lieu of also including directed link cost 840B.

Directed link cost 840B may be considered the unadjusted cost for a directed link. Thus, the directed link cost 840B may be adjusted prior to generation of a route if the mapping system determines that the directed link is proximate to a user-identified designation. The amount that directed link cost 840B may be adjusted depends on the type of designation (e.g., favored or disfavored), the degree of proximity of the directed link to the designation, and more particularly, the degree of proximity between the location of the directed link and the designation location, as described below with respect to FIG. 9.

The intersection cost for each directed link-to-link transition 850B includes an intersection cost for each alternative at an intersection. The intersection cost may be based on the inferred presence of a stop sign, yield sign, traffic light, or other type of traffic control that may increase the likelihood of a stop at an intersection. The likelihood of a stop at an intersection may be referred to as a stop level of the intersection. The stop level also may include an estimate of the length of time spent waiting at the intersection. The stop level of the intersection may be based on the types of roads that intersect. For example, the stop level of an intersection may be based on the intersection of two roads of differing road class type (e.g., an interstate, a U.S. highway, a state road, and a local road). The stop level that may be assigned to an intersection may be a value that occurs within a predetermined range of allowed values. For example, a stop level may be from negative two to two. Negative stop level values may represent more favorable conditions (e.g., a stop is less likely to occur and the time cost associated with the intersection is less severe). Positive stop level values may represent less favorable conditions (e.g., a stop is more likely to occur and the time cost associated with the intersection is more severe).

Additionally or alternatively, a name change of roads associated with the intersection may be determined. A higher intersection cost may be associated with a road name change than an intersection cost that does not include a road name change.

Additionally or alternatively, the intersection cost associated with traveling through the intersection of the previous directed link and the adjacent directed link may be based on the geometry of the roads at the intersection. The geometry of the intersection may describe the number of roads and the orientation of each road relative to one or more other roads that intersect.

Additionally or alternatively, the intersection cost associated with traveling through the intersection of the previous directed link and the adjacent directed link may be based on one or more conditions that may include an intersection with a turn restriction, a false intersection, a ferry, a ramp-to-ramp transition, a merge from a ramp to a non-ramp, an exit from a non-ramp to a ramp, a first limited-access link to a second limited-access link, a limited-access link to a non-limited access link, an intersection with three links, or an intersection with four or more links.

The end node identifier 860B uniquely identifies the particular node that is the end node of the directed link.

Some implementations may include a start node identifier. The ability to traverse between node information, such as the node information that uses node information data structure 800A of FIG. 8A, and directed link information, such as directed link information that uses directed link information data structure 800B of FIG. 8B, may be useful in determining a route. For example, a mapping system may identify the directed links that are adjacent to a particular node, identify the end node of a particular directed link, identify the directed links from that end node, and so on.

Some implementations may use other software engineering techniques to identify a particular node and/or a particular directed link. For example, a geographic tiling method may be used in which a geographic region, such as the United States, is overlaid with a grid of blocks or tiles. Each tile may correspond to a portion of the geographic region and may be inter-linked. For each tile, the latitude and longitude coordinates may be associated with a particular reference point of the tile (e.g., the lower left corner of the tile). A particular location (e.g., a particular node or a particular directed link) may be identified based on an association with a particular tile and the location of the particular location within the tile.

FIG. 9 is a block diagram 900 illustrating the effect of a user-identified designation on nearby directed links. More particularly, block diagram 900 includes origin 910, destination 920, and designation 930. Along a route between origin 910 and destination 920, block diagram 900 also includes a series of nodes, labeled P-X, and links between those nodes, such as, for example, link 960a between nodes Q and R.

For example, a user may wish to travel from origin 910 to destination 920. The user may identify a designation 930 to control route selection.

Once designation 930 has been identified by a user, the mapping system may determine which, if any, routes have links that are proximate to the designation. To do so, the mapping system generates circle 950 around designation 930. In the example of FIG. 9, the mapping system generates a circle because only routes within a certain radius of an identified designation may be affected by the designation. The radius 940 of circle 950 represents the maximum distance within which directed links that make up alternative routes from origin 910 to destination 920 may be influenced by designation 930. The maximum distance of influence may be a pre-determined setting within the mapping system. Additionally, or alternatively, a user may optionally adjust the maximum distance of influence on a global, or per-route request basis.

Thus, routes having links that fall within circle 950 (e.g., links that are located not farther away from designation 930 than the distance represented by radius 940) may receive adjustments to their link costs based on whether the designation is a favored or disfavored designation. Again, costs for links that are proximate to a favored designation may be decreased, while costs for links that are proximate to a disfavored destination may be increased. Links that do not fall within circle 950 (e.g., links that are located farther away from designation 930 than the distance represented by radius 940), may not receive an adjustment in link cost. In some implementations, routes that fall outside circle 950 may have costs for links that make up those routes increased, rather than remaining the same.

The amount that a particular link cost may be adjusted may depend on the relative proximity of a node of the particular link (within circle 950) to the designation. The mapping system may determine the distance between the designation and at least one of the nodes of a particular link, such as node U of link 960b. Based on the distance between the node and the designation, the mapping system may determine a factor to be used to adjust the link cost associated with the particular link. In some implementations, the mapping system may select the node that is closest to the designation to determine the distance between the link and the designation. Alternatively, the mapping system may select the node that is farthest away from the designation. The factor also may reflect the strength of the designation.

In the present example, some links, such as links 960b and 960c, fall within circle 950 and the costs for those links may be adjusted. Other links, such as link 960e, fall outside circle 950 and the costs for those links may remain the same. However, some links, such as link 960a, are located partly within circle 950 and partly outside circle 950. Similarly, other links, such as link 960d, include a node that falls directly on circle 950. In some implementations, the costs for links that are partly located within circle 950, or that have a node resting on circle 950, may be adjusted as if the link was located completely within circle 950. For example, the mapping system may calculate the distance between the designation and a node that falls within circle 950, such as node R, to determine the factor to be used in adjusting the link cost. Additionally, or alternatively, these links may be treated as being located completely outside circle 950 such that the link cost associated with the link remains the same.

For favored designations, the factor may have a value of less than 1 at the center of circle 950. For disfavored designations, the factor may have a value that is greater than 1 at the center of circle 950. In either case, the value of the factor at the edge of circle 950 is 1. In other words, the factor is strongest at the center of the circle and is weakest at the edge of the circle (e.g., at the distance represented by radius 940). Thus, links closest to the center of circle 950 (e.g., links closest to designation 930) are influenced by the designation more than links farther away from the center of circle 950. The way in which the value of the factor increases or decreases may be based on a mathematical function, such as, for example, a linear or quadratic function.

For example, a user may identify designation 930 to indicate a preference for a particular route. In this case, designation 930 is a favored designation. To determine which, if any, links are proximate to designation 930, and thus may receive a decrease in cost, the mapping system may generate circle 950 around designation 930, such that designation 930 is the center of circle 950.

The cost for any links that fall outside circle 950 may not be affected by designation 930. However, the cost for any links that fall within circle 950 may be decreased, thus favoring any routes that traverse those links to be generated as the route. For example, link 960b is located within circle 950. The mapping system may determine the distance 970 between at least one of the nodes of link 960b, such as node V, and designation 930. The distance 970 may relate to a particular factor, such as, for example, a factor of ⅞. The factor has a value less than 1 because the designation 930, in the present example, is a favored designation.

The mapping system may multiply the factor (here, ⅞) by the original link cost of link 960b to determine an adjusted link cost for link 960b. For example, if the original link cost for link 960b is 16, the adjusted link cost for link 960b is 14. In this manner, the mapping system may determine an adjusted link cost for all links that fall within circle 950. The link costs of links that make up a particular route then may be summed to determine a total route cost.

The previous example of decreasing costs of links that are proximate to designation 930 of FIG. 9 is relevant for designations that are favored designations. Additionally or alternatively, the user may identify designation 930 to indicate that routes proximate to designation 930 are disfavored. If a designation is a disfavored designation, link costs may be increased in the same manner based on a factor that is greater than 1.

In some implementations, proximity between a particular link and a designation may be determined based on the location of a particular link in relation to a series of concentric circles generated around the designation. Each of the concentric circles may have a radius that is smaller than the radius of maximum influence, such as radius 940 of circle 950. The mapping system need only determine which concentric circle the link (or a portion thereof) falls within to determine the amount by which to adjust the link cost associated with the link. In some implementations, a concentric circle may be associated with a factor to be used to adjust the link cost, in a manner similar to that described previously. Alternatively, or additionally, a concentric circle may be associated with a particular amount to be used to adjust the link cost.

FIG. 10 is an exemplary user interface 1000 for a mapping system configured to allow a user to enter an origin, a destination, and route preference information using text entry and selection of menu options. More particularly, user interface 1000 may prompt a user to enter an origin, a destination, and route preference information by including sub-window 1010 instructing the user to "Enter Origin Information," sub-window 1020 instructing the user to "Enter Destination Information," and sub-window 1030 instructing the user to "Select Route Preferences."

In sub-window 1010, a user may enter a specific street address for an origin location by filling in text entry boxes for street 1011, city 1012, state 1013, and zip code 1014. Similarly, in sub-window 1020, a user may enter a specific street address for a destination location by filling in text entry boxes for street 1021, city 1022, state 1023, and zip code 1024.

However, a user need not specify an exact street address for either the origin or the destination. The user need only enter a city in text entry boxes 1012 and/or 1022, and a state in text entry boxes 1013 and/or 1023, or a zip code in text entry boxes 1014 and/or 1024. In some implementations, the mapping system may use the center of the indicated city as the origin or destination. In other implementations, the mapping system may use another pre-determined location within the indicated city as the origin or destination. In still other implementations, the mapping system may prompt the user for a particular location within the city to be used as the origin or destination in this and/or future route requests involving that city.

User interface 1000 also allows a user to select route direction preferences in sub-window 1030. The user may select one, or both, of checkboxes 1031 and/or 1034 to indicate that the user is entering a favored route direction, a disfavored route direction, or both. If the user wishes to favor a particular route direction, the user may select checkbox 1031. The user may click on the "Direction" drop-down menu 1032 (by clicking on down arrow 1032a) to select the favored direction. Clicking on down arrow 1032a reveals direction choices 1033 of North, East, South, and West. The user may select one of the revealed direction choices 1033. Similarly, if a user wishes to disfavor a particular route direction, the user may select checkbox 1032 and further click on down arrow 1035a to reveal a drop-down "Direction" menu 1035 in a manner similar to that described with respect to drop-down menu 1032. In addition, a user may select both checkboxes 1031 and 1034 to indicate a preference for a favored route direction and a disfavored route direction.

Instead of choosing general route directions to influence a route from an origin to a destination, a user may indicate various designations on a map showing the origin and destination. To do so, the user may click on hyperlink 1040, having a label, such as "Click HERE to Choose Route Preferences Using Point-And-Click Map." Upon selecting hyperlink 1040, a user may be provided with a map, such as user interface 1130 of FIG. 11, that is configured to accept designations. The map may include a single route generated between the origin and destination locations entered by the user in user interface 1000, more than one route generated between the origin and the destination, the origin and destination locations with no routes between them, or no indication of the origin, destination, or any related routes.

FIG. 11 depicts two exemplary user interfaces, user interface 1100 and user interface 1130, for a mapping system configured to allow a user to enter an origin, a destination, and route preference information using a combination of text entry and a map. More particularly, FIG. 11 includes user interface 1110 configured to allow a user to select a geographic region for a map and also includes user interface 1130 configured to allow a user to graphically select an origin, destination, and a designation indicating a route preference.

A user may select a geographic region for a map in two ways using user interface 1110. A user may use text entry boxes 1120 to enter specific location information, such as city 1121, state, 1122, or zip code 1123. The user need not enter text in more than one of location information text entry boxes 1121, 1122 and/or 1123, and may enter text into any combination of two text entry boxes, or all three text entry boxes. Alternatively, a user may select hyperlink 1125 to view a list of geographic regions (not shown) and select a geographic region for the map from the list presented.

User interface 1130 includes a control panel window 1140 and an interactive map window 1150. The control panel window 1140 and the interactive map window 1150 are used in conjunction to allow a user to select an origin and a destination, and to identify designations related to favored and disfavored routes.

Control panel window 1140 includes control buttons for selecting an origin location 1160, selecting a destination location 1170, favoring a direction 1180, and disfavoring a direction 1190. A user may select one of the control buttons to change the user's pointing device, such as a mouse, to be an indicator 1161 for control button 1160, an indicator 1171 for control button 1170, an indicator 1181 for control button 1180, and an indicator 1191 for control button 1190. For example, a user's mouse may change to indicator 1161, the letter "O" inside a box, to allow a user to identify a spot on map 1150 as the origin location.

Once the user's mouse has changed to one of indicators 1161, 1171, 1181 or 1191, the user may click on interactive map window 1150 at the spot where the user wishes to identify an origin location if indicator 1161 is active, a destination location if indicator 1171 is active, a favored location for a route if indicator 1181 is active, or a disfavored location for a route if indicator 1191 is active. To ensure an accurate identification of locations, a user may adjust map 1150 by zooming in or zooming out until an appropriate, or desired, amount of detail is shown.

Once a particular spot on the map shown in interactive map window 1150 has been identified by the user, an indicator may remain in interactive map window 1150 to show the various user-designated locations. For example, interactive map window 1150 currently includes indicator 1162 showing a user-identified origin location, indicator 1172 showing a user-identified destination location, and indicator 1182 showing a user-identified favored route location.

In some implementations, a user may increase the size of the indicator that remains in interactive map window 1150 to indicate a favored (or disfavored) designation that includes a wide area, such as an entire town, city, zip code, state, or region. For example, a user may increase the size of indicator 1182 to indicate that the user favors several neighborhoods around the placement of indicator 1182.

In some implementations, a user may identify only one origin and one destination within interactive map window 1150. In some other implementations, a user may identify one origin and more than one destination within interactive map window 1150. Identifying multiple destinations may cause the mapping system to generate a route between the origin and each destination. In other implementations, a user may identify a series of locations, such that a user wishes to travel from a beginning origin to a first destination, from the first destination to a second destination, and so on. In this case, the mapping system may generate a route between each origin and destination pair, and may also generate a route between the first origin and the last destination that includes each of the intermediate destinations.

With respect to favored and disfavored route designations, in some implementations, a user may identify one favored location and one disfavored location. In other implementations, a user may identify more than one favored location and/or more than one disfavored location. In still other implementations, a user may be restricted to identifying one of a favored or disfavored location, but not both.

In some implementations, identifying a spot on the map shown in interactive map window 1150 as an origin, destination, or route preference designation may cause a list or table to be populated with location information derived from the identification. The list or table may or may not be visible to the user. For example, if a user selects 1425 K Street, NW in Washington, D.C. as an origin location, the mapping system may automatically populate a list or table with information indicating that the origin location is 1425 K Street, NW in Washington, D.C.

In addition, or as an alternative, to user interface 1000 of FIG. 10 and user interfaces 1100 of FIG. 11, a mapping system may employ other types of user interfaces configured to allow a user to enter an origin location, a destination location and route preference information. For example, a user interface may be provided for a user to enter specific origin and destination locations, such as in user interface 1000. For the same user, a user interface having a map, such as user interface 1130, may be provided allow the user to identify a designation to indicate a favored, or disfavored, route location information.

Figures 12A, 12B:
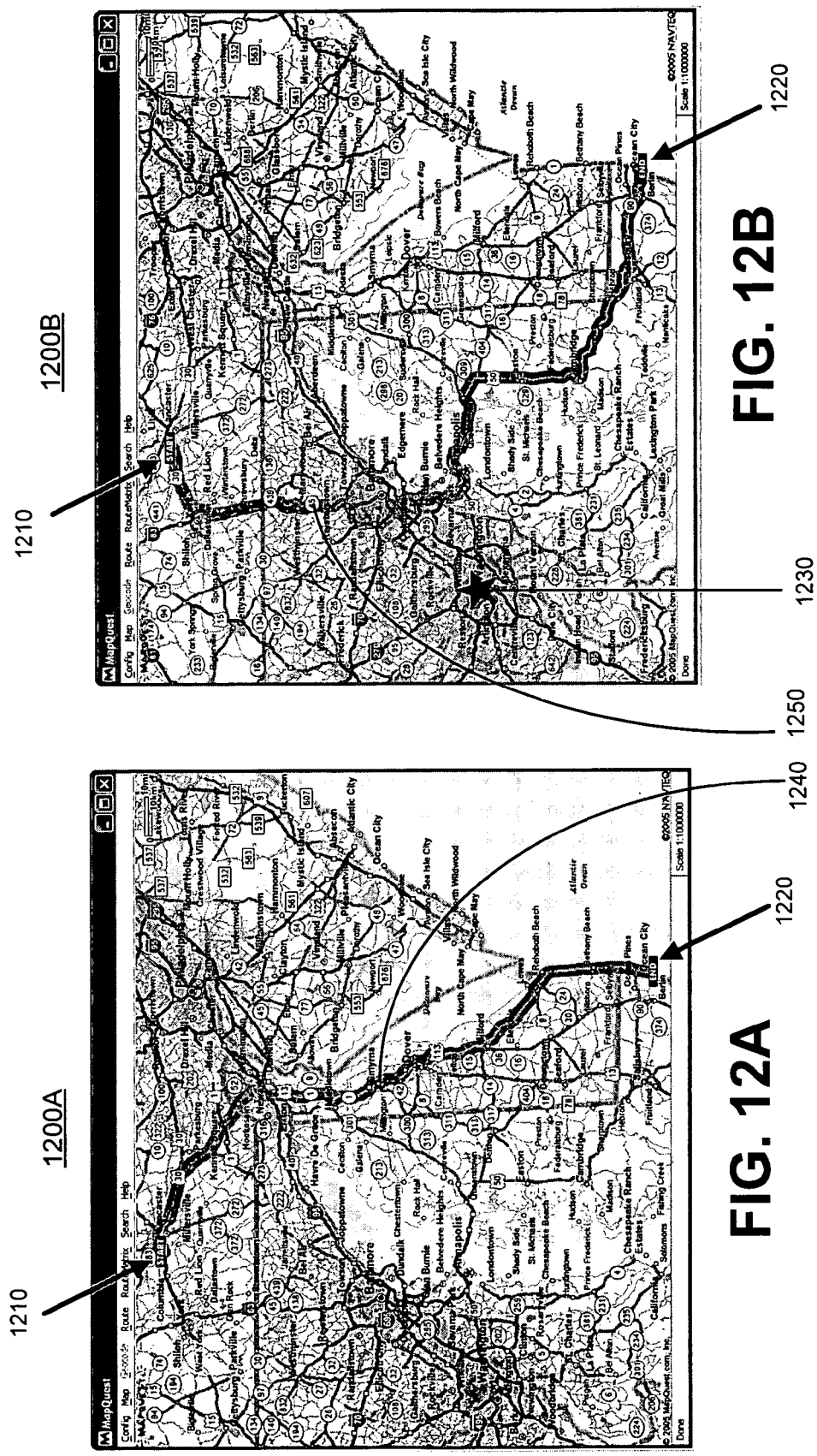
FIGS. 12A, 12B, 13A and 13B are illustrations of two maps showing two alternative routes between an origin and a destination and a designation related to a geographic location.

FIGS. 12A and 12B are illustrations of two exemplary maps 1200A and 1200B showing two alternative routes between an origin and a destination, as well as a designation related to a favored route location. In the example of maps 1200A and 1200B, origin 1210 represents Lancaster, Pa. and destination 1220 represents Ocean City, Md.

Map 1200A includes a route 1240 between origin 1210 and destination 1220. Route 1240 is a route that may be generated by the mapping system absent any user-identified designations that influence the generation of the route. In other words, route 1240 is the overall lowest cost route between origin 1210 and destination 1220. Route 1240 is located to the east of Baltimore, Md. However, a user may wish to travel to the west of Baltimore, Md. Therefore, the user may identify a favored designation, such as designation 1230 of map 1200B, to indicate the user's preference that the route generated by the mapping system be closer to, and to the west of, Baltimore, Md.

Map 1200B includes route 1250 between the same origin 1210 and destination 1220 as in map 1200A. Map 1200B also includes designation 1230. Designation 1230 is a favored designation, such that a user may identify designation 1230 to influence the mapping system to generate a route between origin 1210 and destination 1220 that is nearer to designation 1230 than an alternative route. Route 1250 is a route that may be generated by the mapping system when the route generation process is influenced by designation 1230. Route 1250 is located to the west of Baltimore, Md.

Figure 13A:
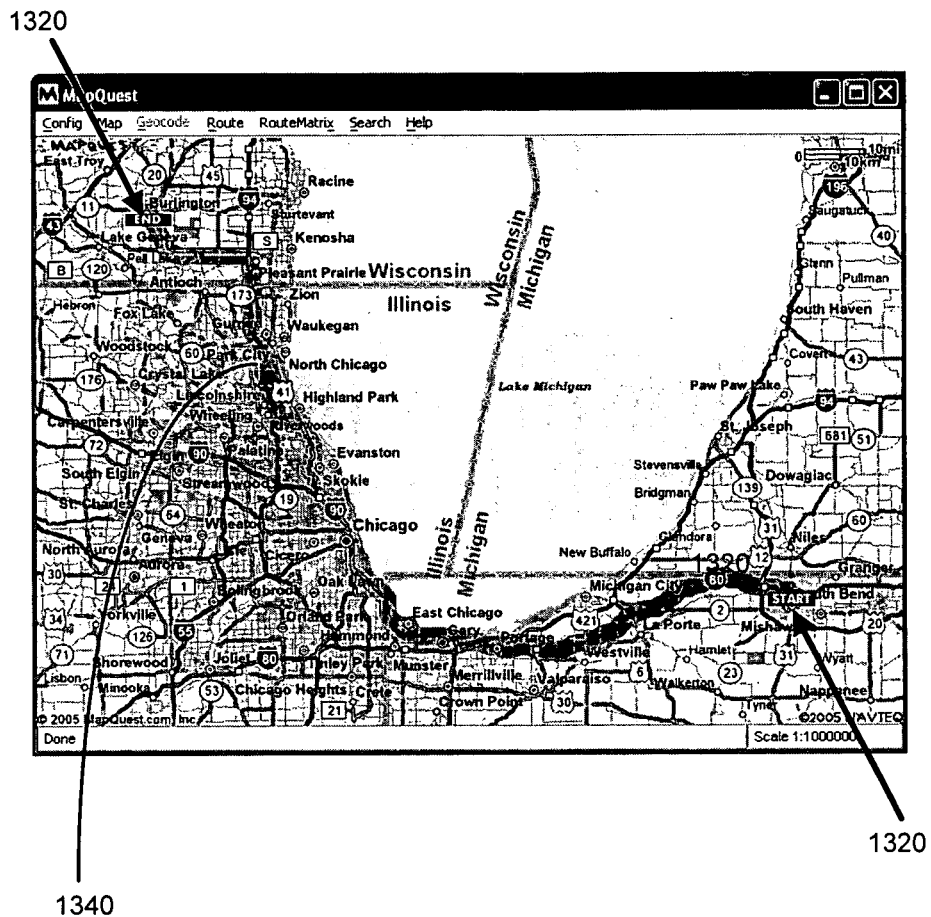
Figure 13B:
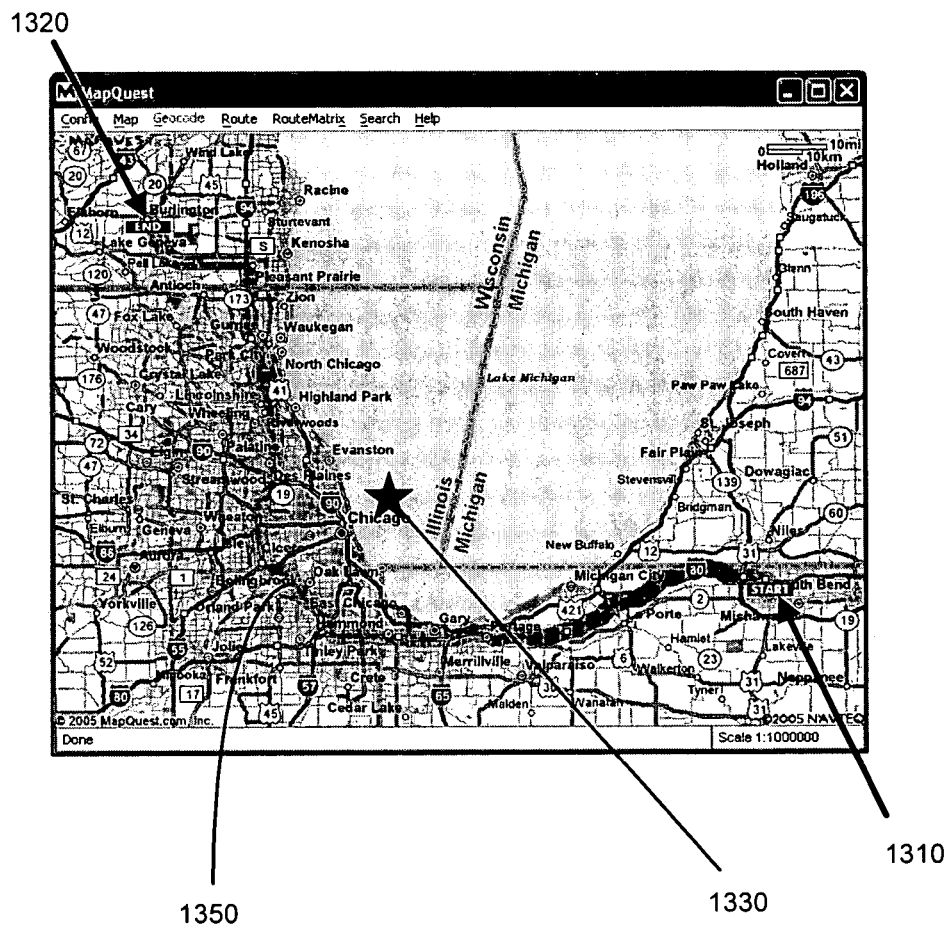

FIGS. 13A and 13B are illustrations of two exemplary maps 1300A and 1300B showing two alternative routes between an origin and a destination, as well as a designation related to a disfavored route location. In the example of maps 1300A and 1300B, origin 1310 represents South Bend, Ind. and destination 1320 represents Burlington, Wis.

Map 1300A includes a route 1340 between origin 1310 and destination 1320. Route 1340 is a route that may be generated by the mapping system absent any user-identified designations to influence the generation of the route. In other words, route 1340 is the overall lowest cost route between origin 1310 and destination 1320. Route 1340 travels through Chicago, Ill. However, a user may wish to avoid Chicago, Ill. because of, for example, the traffic associated with traveling through the heart of a major city. Therefore, the user may identify a disfavored designation, such as designation 1330 of map 1300B, to indicate the user's preference that the route generated by the mapping system does not traverse through or near Chicago, Ill.

Map 1300B includes route 1350 between the same origin 1310 and destination 1320 as in map 1300A. Map 1300B also includes designation 1330. Designation 1330 is a disfavored designation, such that a user may identify designation 1330 to influence the mapping system to generate a route between origin 1310 and destination 1320 that is farther from designation 1330 than an alternative route. Route 1350 is a route that may be generated by the mapping system when the route generation process is influenced by designation 1330. Route 1350 avoids Chicago, Ill.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. As another example, a screen name is used throughout to represent a unique identifier of an account, but any other unique identifier of an account may be used when linking accounts. Accordingly, other implementations are within the scope of the following claims.

What is claimed is:

1. A method, performed at least partially on a computer, for determining a route using a computer-implemented mapping system, the method comprising:
   receiving a designation of a point on a map presented by a computer-implemented mapping system as input to influence route determination between an origin and a destination, the designation being received from a user of the computer-implemented mapping system and the designation being in a location other than a location of the origin or the destination;
   using the designation of the point to influence determination of a route from the origin to the destination toward or away from a location corresponding to the point, the route not including the location corresponding to the point, and the designation indicating the user's preference for one of multiple alternative routes between the origin and the destination; and
   enabling presentation of the route to the user.

2. The method of claim 1 wherein the designation reflects a favored geographic region and indicates the user's preference for a route that is closer to the geographic region than other ones of the multiple alternative routes.

3. The method of claim 1 wherein the designation reflects a disfavored geographic region and indicates the user's preference for a route that is farther from the geographic region than other ones of the multiple alternative routes.

4. The method of claim 1 further comprising accessing at least part of a routing graph representing a network of roads including two or more nodes and one or more links, each link being associated with at least two nodes and being associated with a cost,
   wherein:
   the designation reflects a disfavored geographic region, and
   using the designation of the point to influence determination of a route comprises increasing a cost associated with a link that is proximate to the disfavored geographic region reflected by the designation.

5. The method of claim 4 wherein increasing the cost of the link includes increasing the cost of the link if the link is within a particular radius from the designation of the point.

6. The method of claim 5 wherein increasing the cost includes increasing the cost by an amount depending on the distance between a node of the link and the designation of the point.

7. The method of claim 1 further comprising accessing at least part of a routing graph representing a network of roads including two or more nodes and one or more links, each link being associated with at least two nodes and being associated with a cost,
   wherein:
   the designation reflects a favored geographic region, and
   using the designation of the point to influence determination of a route comprises decreasing a cost associated with a link that is proximate to the favored geographic region reflected by the designation.

8. The method of claim 7 wherein decreasing the cost of the link includes decreasing the cost of the link if the link is within a particular radius from the designation of the point.

9. The method of claim 8 wherein decreasing the cost includes decreasing the cost by an amount depending on the distance between a node of the link and the designation of the point.

10. The method of claim 1 further comprising enabling user-selection of a pre-determined designation of a point to influence route selection, wherein the designation of the point is the pre-determined designation.

11. The method of claim 1 wherein receiving the designation of the point further comprises:
presenting a user with a map related to a geographic region selected by the user; and
receiving the designation of the point based on the map.

12. The method of claim 11 further comprising:
depicting more than one designation of points on the presented map; and
receiving one or more designations of a point selected by the user.

13. The method of claim 1 further comprising using a navigation system to determine the route between the origin and the destination.

14. The method of claim 1 wherein the computer-implemented mapping system comprises an online system.

15. An apparatus for determining a route using a computer-implemented mapping system, comprising:
at least one processor; and
a memory device that stores instructions that, when executed by the at least one processor, cause the at least one processor to:
receive a designation of a point on a map presented by a computer-implemented mapping system as input to influence route determination between an origin and a destination, the designation being received from a user of the computer-implemented mapping system and the designation being in a location other than a location of the origin or the destination;
use the designation of the point to influence determination of a route from the origin to the destination toward or away from a location corresponding to the point, the route not including the location corresponding to the point, and the designation indicating the user's preference for one of multiple alternative routes between the origin and the destination; and
enable presentation of the route to the user.

16. The apparatus of claim 15 wherein the designation reflects a favored geographic region and indicates the user's preference for a route that is closer to the geographic region than other ones of the multiple alternative routes.

17. The apparatus of claim 15 wherein the designation reflects a disfavored geographic region and indicates the user's preference for a route that is farther from the geographic region than other ones of the multiple alternative routes.

18. The apparatus of claim 15 further being configured to access at least part of a routing graph representing a network of roads including two or more nodes and one or more links, each link being associated with at least two nodes and being associated with a cost,
wherein:
the designation reflects a disfavored geographic region, and
using the designation of the point to influence determination of a route comprises increasing a cost associated with a link that is proximate to the disfavored geographic region reflected by the designation.

19. The apparatus of claim 18 wherein increasing the cost of the link includes increasing the cost of the link if the link is within a particular radius from the designation of the point.

20. The apparatus of claim 19 wherein increasing the cost includes increasing the cost by an amount depending on the distance between a node of the link and the designation of the point.

21. The apparatus of claim 15 further being configured to access at least part of a routing graph representing a network of roads including two or more nodes and one or more links, each link being associated with at least two nodes and being associated with a cost,
wherein:
the designation reflects a favored geographic region, and
using the designation of the point to influence determination of a route comprises decreasing a cost associated with a link that is proximate to the favored geographic region reflected by the designation.

22. The apparatus of claim 21 wherein decreasing the cost of the link includes decreasing the cost of the link if the link is within a particular radius from the designation of the point.

23. The apparatus of claim 22 wherein decreasing the cost includes decreasing the cost by an amount depending on the distance between a node of the link and the designation of the point.

24. The apparatus of claim 15 being further configured to:
present a user with a map related to a geographic region selected by the user; and
receive the designation of the point based on the map related to a geographic region selected by the user.

25. The apparatus of claim 15 being further configured to use a navigation system to determine the route between the origin and the destination.

26. An apparatus for determining a route using a computer-implemented mapping system, the apparatus comprising:
means for receiving a designation of a point on a map presented by a computer-implemented mapping system as input to influence route determination between an origin and a destination, the designation being received from a user of the computer-implemented mapping system and the designation being in a location other than a location of the origin or the destination;
means for using the designation of the point to influence determination of a route from the origin to the destination toward or away from a location corresponding to the point, the route not including the location corresponding to the point, and the designation indicating the user's preference for one of multiple alternative routes between the origin and the destination; and
means for enabling presentation of the route to the user.

27. The method of claim 1 wherein receiving a designation of a point on a map presented by a computer-implemented mapping system as input to influence route determination between an origin and a destination comprises receiving a designation of a point before a route between the origin and the destination is identified.

28. The method of claim 1 wherein receiving a designation of a point includes receiving a designation of a location other than a location of the origin, the destination, or any intermediary destinations.

29. The apparatus of claim 15 wherein being configured to receive a designation includes being configured to receive a designation of a location other than a location of the origin, the destination, or any intermediary destinations.

30. A method, performed at least partially on a computer, for determining a route using a computer-implemented mapping system, the method comprising:
receiving a designation of a direction of travel as input to influence route determination between an origin and a destination, the direction of travel being received from a user of a computer-implemented mapping system;
using the designation of the direction of travel to influence determination of a route from the origin to the destination, the direction of travel indicating the user's preference for one of multiple alternative routes between the origin and the destination; and
enabling presentation of the route to the user.

* * * * *